(12) United States Patent
Itakura et al.

(10) Patent No.: US 7,577,093 B2
(45) Date of Patent: *Aug. 18, 2009

(54) DATA COMMUNICATION SYSTEM, DATA TRANSMISSION APPARATUS, DATA RECEIVING APPARATUS, DATA COMMUNICATION METHOD, DATA TRANSMISSION METHOD, RECEIVED-DATA PROCESSING METHOD, AND COMPUTER PROGRAM

(75) Inventors: Eisaburo Itakura, Kanagawa (JP); Takahiro Fukuhara, Kanagawa (JP); Yasuhiko Ichino, Tokyo (JP)

(73) Assignee: Sony Corporation, Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 11/746,784

(22) Filed: May 10, 2007

(65) Prior Publication Data

US 2007/0206592 A1  Sep. 6, 2007

Related U.S. Application Data

(63) Continuation of application No. 10/292,640, filed on Nov. 12, 2002, now Pat. No. 7,385,921.

(30) Foreign Application Priority Data

Nov. 12, 2001 (JP) ............................ 2001-346413

(51) Int. Cl.
*H04L 12/26* (2006.01)
(52) U.S. Cl. ...................................................... 370/230
(58) Field of Classification Search ......... 370/230–235, 370/464, 465, 474–477; 375/240, 240.01–240.26
See application file for complete search history.

(56) References Cited

U.S. PATENT DOCUMENTS

2002/0104092 A1* 8/2002 Arai et al. ...................... 725/87
2002/0180756 A1* 12/2002 Lee et al. ..................... 345/619

* cited by examiner

*Primary Examiner*—Dmitry Levitan
(74) *Attorney, Agent, or Firm*—K&L Gates LLP

(57) ABSTRACT

A system allows data transfer in which the most appropriate packet processing is executed according to the performance of a terminal. A data transmission side stores scalable-encoded data in a packet as a payload, assigns priority-level information corresponding to a layer level of the encoded data stored in the packet to a packet header, and transmits the packet. A data receiving side performs processing by referring to the priority-level information. A level of priority dependent on an application is specified in an RTP payload header according to the degree of importance of scalable-encoded data, and a level of priority is further specified in an IP header. The most appropriate packet processing based on the performance of a terminal is allowed. Re-transmission control based on the layer level of encoded data is also allowed.

27 Claims, 22 Drawing Sheets

NUMBER OF DIVISION LEVELS: 3
(H: HIGH-FREQUENCY PART,
L: LOW-FREQUENCY PART)

PRIOR ART

FIG. 7

| 3LL 701 | 3HL 702 | 2HL 705 | 1HL 708 |
| 3LH 703 | 3HH 704 | | |
| 2LH 706 | | 2HH 707 | |
| 1LH 709 | | | 1HH 710 |

PRIOR ART

FIG. 8

| SOC | MAIN HEADER | ENCODED DATA | EOC |

PRIOR ART

FIG. 14

| VERSION | HEADER LENGTH | TOS | PACKET LENGTH ||
|---|---|---|---|---|
| IDENTIFICATION ||| FLAG | FRAGMENT OFFSET |
| TTL || PROTOCOL | HEADER CHECKSUM ||
| SOURCE IP ADDRESS |||||
| DESTINATION IP ADDRESS |||||
| OPTION |||||

PRIOR ART

FIG. 15

| LAYER | RTP PAYLOAD HEADER | IP HEADER |
|---|---|---|
| LAYER 0 | 0 | 0 |
| LAYER 1 | 1 | 1 |
| LAYER 2 | 2 | 1 |
| LAYER 3 | 3 | 2 |
| LAYER 4 | 4 | 2 |

FIG. 16

| RESOLUTION | SNR (IMAGE QUALITY) | LEVEL OF PRIORITY | |
|---|---|---|---|
| | | RTP PAYLOAD HEADER | IP HEADER |
| 2 | 2 | 4 | 2 |
| | 1 | 3 | |
| | 0 | | |
| 1 | 2 | 2 | 1 |
| | 1 | | |
| | 0 | 1 | |
| 0 | 2 | 0 | 0 |
| | 1 | | |
| | 0 | | |

DATA COMMUNICATION SYSTEM, DATA TRANSMISSION APPARATUS, DATA RECEIVING APPARATUS, DATA COMMUNICATION METHOD, DATA TRANSMISSION METHOD, RECEIVED-DATA PROCESSING METHOD, AND COMPUTER PROGRAM

CROSS REFERENCE TO RELATED APPLICATIONS

This patent application is a continuation of U.S. application Ser. No. 10/292,640 filed on Nov. 12, 2002, the disclosures of which are herein incorporated by reference.

BACKGROUND OF THE INVENTION

The present invention relates to data communication systems, data transmission apparatuses, data receiving apparatuses, data communication methods, data transmission methods, received-data processing methods, and computer programs and, more particularly, to a data communication system, a data transmission apparatus, a data receiving apparatus, a data communication method, a data transmission method, a received-data processing method, and a computer program which assign a degree of priority to encoded image information and transmit and receive the encoded image information.

Various types of data transfer have been performed through various communication media, such as the Internet. Recently, image data, especially moving-image data, has been increasingly transferred through networks. In general, image data, especially moving-image data, is encoded (compressed) at a transmission side to reduce the amount of data, is sent to a network, and the received encoded signal is decoded (decompressed) at a receiving side.

One of the most known image compression methods is the Moving Pictures Experts Group (MPEG) compression technology. These days, technical developments have been actively performed which relate to a system in which an MPEG stream is stored in IP packets conforming to the Internet Protocol (IP), transmitted on the Internet, and received by communication terminals, such as PCs, PDAs, and portable telephones, or to an image-data transfer method in such a system.

It is necessary to assume that data transfer is performed with receiving terminals having different performance, in video on demand, in streaming distribution of live images, and in real-time communications in video conferences and video phones. For example, data transmitted from one information transmission source is received by a receiving terminal having a low-resolution display and a low-performance CPU, such as a portable telephone, and displayed on the display, and is also received by a receiving terminal having a high-resolution monitor and a high-performance CPU, such as a desk-top personal computer, and displayed. Data transmission is performed in this way to various receiving terminals having difference processing performance. As a method for allowing such various receiving terminals to execute receiving processing and display processing according to their processing performance, a method for hierarchically encoding transfer data has been examined, which leads to a communication system using scalable encoding.

In scalable-encoded data distribution, for example, encoded data to be processed only by a receiving terminal having a high-resolution display and encoded data to be processed in common by both of a receiving terminal having a high-resolution display and a receiving terminal having a low-resolution display are packetized in a distinguishable manner and distributed, and the receiving terminals select corresponding data and process it.

As compression and decompression methods which allow scalable encoding, MPEG-4 and JPEG-2000 can be, for example, taken. MPEG-4 will include a fine granuality scalability technology and it is said that distribution is hierarchically possible at a low bit rate to a high bit rate with this scalable encoding technology. JPEG-2000 is based on the wavelet transform, and makes the best use of the features of the wavelet transform to be able to perform packetization based on spatial resolutions or to be able to perform hierarchical packetization based on image quality. Motion JPEG-2000 (part 3) can handle moving images as well as still images, and can save scalable data in a file format.

In conventional data distribution systems, it is necessary for a transmission side to generate data having different formats corresponding to the performance of data receiving terminals or to prepare different data at the transmission rates of the data receiving terminals. When the above-described scalable encoding is applied, data distribution is made possible at the same time from one file to terminals having different performance.

When data to be distributed is image data, for example, since real-time response is required, the user datagram protocol (UDP) is used in many cases for communication on the Internet. In addition, the real-time transport protocol (RTP) is used in the layer above the layer where UDP is used, and a format defined for each application, that is, each encoding method, is used. When UDP is used, since a packet is not regenerated, unlike transmission control protocol (TCP)/IP, a packet loss may occur due to network congestion.

A discrete-cosine-transform-(DCT)-based technology has been proposed for a specific data distribution case to which scalable encoding is applied. In this technology, DCT processing is applied to distribution information, such as image data, to generate layers with a high-frequency signal and a low-frequency signal being distinguished, packets are generated in a high-frequency layer and a low-frequency layer, and data distribution is executed.

When the proposed data distribution in which DCT is used for the high-frequency and low-frequency layer process is executed, however, receiving terminals can execute packet processing according to levels of priority for a high-frequency signal and a low-frequency signal, determined, for example, by the performance of the terminals. There are only two levels of priority, one for a high-frequency signal and the other for a low-frequency signal. In contrast, the bandwidths of network fluctuate in various ways. Therefore, it is difficult to say that only the processing based on two levels of priority is sufficient for handling various types of fluctuations of the bandwidths of networks. In addition, the DCT-based scalable technology is not sufficient for allowing terminals having different resolutions, for example, receiving terminals having a large resolution difference such as a portable telephone and a personal computer, to execute the most appropriate image display processing according to the performance of the terminals.

Further, since encoding is executed by using-inter-frame difference information in MPEG, when a packet loss occurs on the Internet, for example, block noise unique to MPEG occurs across a number of frames. The RTP format is defined for Motion JPEG in the IETF document, RFC 2435. The RTP format is not defined for JPEG-2000 video streams. Although it is better to apply a different process for an error and a packet loss to each layer with a packet loss being taken into account, there was no such packetizing method.

SUMMARY OF THE INVENTION

The present invention has been made in consideration of the foregoing problems. It is an object of the present invention to provide a data communication system, a data transmission apparatus, a data receiving apparatus, a data communication method, a data transmission method, a received-data processing method, and a computer program which, in data distribution to which scalable encoding is applied, allow processing corresponding to various types of fluctuations of the bandwidths of networks to be performed, and allow, if an error such as a packet loss occurs on a network, a reduction in quality of received data to be suppressed as much as possible.

The foregoing object is achieved in one embodiment of the present invention through the provision of a data communication system including a data transmission apparatus and a data receiving apparatus. The data transmission apparatus includes encoding parts for applying scalable encoding processing by using wavelet transform to an image signal, and packet generation parts for generating a packet which stores scalable-encoded data generated by the encoding parts and for specifying priority-level information corresponding to a layer of the scalable-encoded data of the image signal, stored in the generated packet, as additional information of the generated packet. The data receiving apparatus includes decoding parts for applying decoding processing to data stored in a packet to which the information of a level of priority equal to or larger than a value specified according to the processing performance of the data receiving apparatus is assigned.

The data communication system may be configured such that the data receiving apparatus further includes packet-priority-level-information determination parts for determining whether a packet has the information of a level of priority equal to or larger than the value specified according to the processing performance of the data receiving apparatus, and the decoding parts apply the decoding processing to data stored in a packet selected by the packet-priority-level-information determination parts.

The data communication system may be configured such that the packet generation parts specify the priority-level information corresponding to the layer of the scalable-encoded data of the image signal, in an RTP header.

The data communication system may be configured such that the packet generation parts specify the priority-level information corresponding to the layer of the scalable-encoded data of the image signal, in an IP header.

The data communication system may be configured such that the packet generation parts specify the priority-level information corresponding to the layer of the scalable-encoded data of the image signal, in an RTP header and an IP header.

The data communication system may be configured such that the packet generation parts specify the priority-level information corresponding to the layer of the scalable-encoded data of the image signal, stored in the generated packet, as additional information of the generated packet, according to a priority-level setting map in which the layer of the scalable-encoded data is associated with a level of priority.

The data communication system may be configured such that the data transmission apparatus further includes a structure for receiving receiving-terminal information from the data receiving apparatus, and the packet generation parts dynamically change the priority-level information corresponding to the layer of the scalable-encoded data of the image signal, stored in the packet, according to the receiving-terminal information.

The data communication system may be configured such that the data transmission apparatus dynamically changes the priority-level information corresponding to the layer of the scalable-encoded data of the image signal, stored in the packet, according to a network condition.

The data communication system may be configured such that the encoding parts of the data transmission apparatus apply the scalable-encoding processing by using the wavelet transform to the image signal, and generate encoded data having different spatial resolutions generated by the wavelet transform, and the packet generation parts specify priority-level information corresponding to layers of the spatial resolutions of the encoded data having the different spatial resolutions, as additional information of the generated packet.

The data communication system may be configured such that the encoding parts of the data transmission apparatus generates scalable-encoded data by progressive encoding processing, and the packet generation parts specify priority-level information corresponding to a layer specified for a progressive order of the scalable-encoded data generated by applying the progressive encoding processing to the image signal and stored in the generated packet, as additional information of the generated packet.

The data communication system may be configured such that the encoding parts of the data transmission apparatus generate scalable-encoded data by progressive encoding processing in which different spatial resolutions are specified in a progressive order, and the packet generation parts specify priority-level information corresponding to a layer specified for each spatial resolution of the scalable-encoded data of the image signal, stored in the generated packet, as additional information of the generated packet.

The data communication system may be configured such that the encoding parts of the data transmission apparatus generate scalable-encoded data by progressive encoding processing in which different SNRs are specified in a progressive order, and the packet generation parts specify priority-level information corresponding to a layer specified for each SNR of the scalable-encoded data of the image signal, stored in the generated packet, as additional information of the generated packet.

The data communication system may be configured such that the encoding parts of the data transmission apparatus generate scalable-encoded data by progressive encoding processing in which different color components are specified in a progressive order, and the packet generation parts specify priority-level information corresponding to a layer specified for each color component of the scalable-encoded data of the image signal, stored in the generated packet, as additional information of the generated packet.

The data communication system may be configured such that the encoding parts of the data transmission apparatus further includes a retransmission control structure for, in response to a packet re-transmission request sent from the data receiving apparatus, determining the levels of priority assigned to packets for which the re-transmission request has been sent; for determining whether re-transmission is to be performed according to the determined levels of priority, and for re-transmitting packets having higher levels of priority earlier.

The foregoing object is achieved in another embodiment of the present invention through the provision of a data transmission apparatus for storing image data in a packet and for transmitting the packet, including encoding parts for applying scalable-encoding processing by using wavelet transform to an image signal, and packet generation parts for generating a packet which stores scalable-encoded data generated by the encoding parts and for specifying priority-level information corresponding to a layer of the scalable-encoded data of the image signal, stored in the generated packet, as additional information of the generated packet.

The data transmission apparatus may be configured such that the packet generation parts specify the priority-level information corresponding to the layer of the scalable-encoded data of the image signal, in an RTP header.

The data transmission apparatus may be configured such that the packet generation parts specify the priority-level information corresponding to the layer of the scalable-encoded data of the image signal, in an IP header.

The data transmission apparatus may be configured such that the packet generation parts specify the priority-level information corresponding to the layer of the scalable-encoded data of the image signal, in an RTP header and an IP header.

The data transmission apparatus may be configured such that the packet generation parts specify the priority-level information corresponding to the layer of the scalable-encoded data of the image signal, stored in the generated packet, as additional information of the generated packet, according to a priority-level setting map in which the layer of the scalable-encoded data is associated with a level of priority.

The data transmission apparatus may be configured such that the data transmission apparatus further includes a structure for receiving receiving-terminal information from the data receiving apparatus, and the packet generation parts dynamically change the priority-level information corresponding to the layer of the scalable-encoded data of the image signal, stored in the packet, according to the receiving-terminal information.

The data transmission apparatus may dynamically change the priority-level information corresponding to the layer of the scalable-encoded data of the image signal, stored in the packet, according to a network condition.

The data transmission apparatus may be configured such that the encoding parts apply the scalable-encoding processing by using the wavelet transform to the image signal, and generate encoded data having different spatial resolutions generated by the wavelet transform, and the packet generation parts specify priority-level information corresponding to layers of the spatial resolutions of the encoded data having the different spatial resolutions, as additional information of the generated packet.

The data transmission apparatus may be configured such that the encoding parts generate scalable-encoded data by progressive encoding processing, and the packet generation parts specify priority-level information corresponding to a layer specified for a progressive order of the scalable-encoded data generated by applying the progressive encoding processing to the image signal and stored in the generated packet, as additional information of the generated packet.

The data transmission apparatus may be configured such that the encoding parts generate scalable-encoded data by progressive encoding processing in which different spatial resolutions are specified in a progressive order, and the packet generation parts specify priority-level information corresponding to a layer specified for each spatial resolution of the scalable-encoded data of the image signal, stored in the generated packet, as additional information of the generated packet.

The data transmission apparatus may be configured such that the encoding parts generate encoded data by progressive encoding processing in which different SNRs are specified in a progressive order, and the packet generation parts specify priority-level information corresponding to a layer specified for each SNR of the scalable-encoded data of the image signal, stored in the generated packet, as additional information of the generated packet.

The data transmission apparatus may be configured such that the encoding parts generate scalable-encoded data by progressive encoding processing in which different color components are specified in a progressive order, and the packet generation parts specify priority-level information corresponding to a layer specified for each color component of the scalable-encoded data of the image signal, stored in the generated packet, as additional information of the generated packet.

The data transmission apparatus may further include a re-transmission control structure for, in response to a packet re-transmission request sent from the data receiving apparatus, determining the levels of priority assigned to packets for which the re-transmission request has been sent; for determining whether re-transmission is to be performed according to the determined levels of priority, and for re-transmitting packets having higher levels of priority earlier.

The foregoing object is achieved in yet another embodiment of the present invention through the provision of a data receiving apparatus for receiving packets which store encoded data, including receiving parts for receiving packets which store data scalable-encoded by wavelet transform; packet-priority-level-information determination parts for determining whether the packets have the information of a level of priority equal to or larger than a value specified according to the processing performance of the data receiving apparatus; and decoding parts for decoding data stored in packets selected by the packet-priority-level-information determination parts.

The data receiving apparatus may be configured such that the packet-priority-level-information determination parts includes IP-packet filtering parts for determining a level of priority assigned to the IP header of a received packet; and RTP-packet-header scanning parts for determining a level of priority assigned to the RTP header of the received packet.

The foregoing object is achieved in still another embodiment of the present invention through the provision of a data communication method for a data communication system including a data transmission apparatus and a data receiving apparatus, including the steps of an encoding step of applying scalable-encoding processing by using wavelet transform to an image signal; a packet generation step of generating a packet which stores scalable-encoded data generated in the encoding step and of specifying priority-level information corresponding to a layer of the scalable-encoded data of the image signal, stored in the generated packet, as additional information of the generated packet, both steps being executed in the data transmission apparatus; and a decoding step of decoding data stored in a packet to which the information of a level of priority equal to or larger than a value specified according to the processing performance of the data receiving apparatus is assigned, the decoding step being executed in the data receiving apparatus.

The data communication method may be configured such that it further includes a packet-priority-level-information determination step of determining whether a packet has the information of a level of priority equal to or larger than the value specified according to the processing performance of the data receiving apparatus, the packet-priority-level-information determination step being executed by the data receiving apparatus, and the decoding step decodes data stored in a packet selected by the packet-priority-level-information determination step.

The data communication method may be configured such that the packet generation step includes a step of specifying the priority-level information corresponding to the layer of the scalable-encoded data of the image signal, in an RTP header.

The data communication method may be configured such that the packet generation step includes a step of specifying the priority-level information corresponding to the layer of the scalable-encoded data of the image signal, in an IP header.

The data communication method may be configured such that the packet generation step includes a step of specifying the priority-level information corresponding to the layer of the scalable-encoded data of the image signal, in an RTP header and an IP header.

The data communication method may be configured such that the packet generation step includes a step of specifying the priority-level information corresponding to the layer of the scalable-encoded data of the image signal, stored in the generated packet, as additional information of the generated packet, according to a priority-level setting map in which the layer of the scalable-encoded data is associated with a level of priority.

The data communication method may be configured such that it further includes a step of receiving receiving-terminal information from the data receiving apparatus, the step being executed by the data transmission apparatus, and the packet generation step includes a step of dynamically changing the priority-level information corresponding to the layer of the scalable-encoded data of the image signal, stored in the packet, according to the receiving-terminal information.

The data communication method may be configured such that it further includes a step of dynamically changing the priority-level information corresponding to the layer of the scalable-encoded data of the image signal, stored in the packet, according to a network condition, the step being executed by the data transmission apparatus.

The data communication method may be configured such that the encoding step executed in the data transmission apparatus includes a step of applying the scalable-encoding processing by using the wavelet transform to the image signal, and of generating encoded data having different spatial resolutions generated by the wavelet transform, and the packet generation step includes a step of specifying priority-level information corresponding to layers of the spatial resolutions of the encoded data having the different spatial resolutions, as additional information of the generated packet.

The data communication method may be configured such that the encoding step executed in the data transmission apparatus includes a step of generating scalable-encoded data by progressive encoding processing, and the packet generation step includes a step of specifying priority-level information corresponding to a layer specified for a progressive order of the scalable-encoded data generated by applying the progressive encoding processing to the image signal and stored in the generated packet, as additional information of the generated packet.

The data communication method may be configured such that the encoding step executed in the data transmission apparatus includes a step of generating scalable-encoded data by progressive encoding processing in which different spatial resolutions are specified in a progressive order, and the packet generation step includes a step of specifying priority-level information corresponding to a layer specified for each spatial resolution of the scalable-encoded data of the image signal, stored in the generated packet, as additional information of the generated packet.

The data communication method may be configured such that the encoding step executed in the data transmission apparatus includes a step of generating scalable-encoded data by progressive encoding processing in which different SNRs are specified in a progressive order, and the packet generation step includes a step of specifying priority-level information corresponding to a layer specified for each SNR of the scalable-encoded data of the image signal, stored in the generated packet, as additional information of the generated packet.

The data communication method may be configured such that the encoding step executed in the data transmission apparatus includes a step of generating scalable-encoded data by progressive encoding processing in which different color components are specified in a progressive order, and the packet generation step includes a step of specifying priority-level information corresponding to a layer specified for each color component of the scalable-encoded data of the image signal, stored in the generated packet, as additional information of the generated packet.

The data communication method may further include a step of, in response to a packet re-transmission request sent from the data receiving apparatus, determining the levels of priority assigned to packets for which the retransmission request has been sent; of determining whether re-transmission is to be performed according to the determined levels of priority, and of re-transmitting packets having higher levels of priority earlier, the step being executed by the data transmission apparatus.

The foregoing object is achieved in still yet another embodiment of the present invention through the provision of a data transmission method for storing image data in a packet and for transmitting the packet, including the steps of an encoding step of applying scalable-encoding processing by using wavelet transform to an image signal, and a packet generation step of generating a packet which stores scalable-encoded data generated in the encoding step and of specifying priority-level information corresponding to a layer of the scalable-encoded data of the image signal, stored in the generated packet, as additional information of the generated packet.

The data transmission method may be configured such that the packet generation step includes a step of specifying the priority-level information corresponding to the layer of the scalable-encoded data of the image signal, in an RTP header.

The data transmission method may be configured such that the packet generation step includes a step of specifying the priority-level information corresponding to the layer of the scalable-encoded data of the image signal, in an IP header.

The data transmission method may be configured such that the packet generation step includes a step of specifying the priority-level information corresponding to the layer of the scalable-encoded data of the image signal, in an RTP header and an IP header.

The data transmission method may be configured such that the packet generation step includes a step of specifying the priority-level information corresponding to the layer of the scalable-encoded data of the image signal, stored in the generated packet, as additional information of the generated packet, according to a priority-level setting map in which the layer of the scalable-encoded data is associated with a level of priority.

The data transmission method may be configured such that it further includes a step of receiving receiving-terminal information from the data receiving apparatus, the step being executed by the data transmission apparatus, and the packet generation step includes a step of dynamically changing the priority-level information corresponding to the layer of the scalable-encoded data of the image signal, stored in the packet, according to the receiving-terminal information.

The data transmission method may be configured such that it further includes a step of dynamically changing the priority-level information corresponding to the layer of the scalable-encoded data of the image signal, stored in the packet, according to a network condition, the step being executed by the data transmission apparatus.

The data transmission method may be configured such that the encoding step includes a step of applying the scalable-encoding processing by using the wavelet transform to the image signal, and of generating encoded data having different spatial resolutions generated by the wavelet transform, and the packet generation step includes a step of specifying priority-level information corresponding to layers of the spatial resolutions of the encoded data having the different spatial resolutions, as additional information of the generated packet.

The data transmission method may be configured such that the encoding step includes a step of generating scalable-encoded data by progressive encoding processing, and the packet generation step includes a step of specifying priority-level information corresponding to a layer specified for a progressive order of the scalable-encoded data generated by applying the progressive encoding processing to the image signal and stored in the generated packet, as additional information of the generated packet.

The data transmission method may be configured such that the encoding step includes a step of generating scalable-encoded data by progressive encoding processing in which different spatial resolutions are specified in a progressive order, and the packet generation step includes a step of specifying priority-level information corresponding to a layer specified for each spatial resolution of the scalable-encoded data of the image signal, stored in the generated packet, as additional information of the generated packet.

The data transmission method may be configured such that the encoding step includes a step of generating scalable-encoded data by progressive encoding processing in which different SNRs are specified in a progressive order, and the packet generation step includes a step of specifying priority-level information corresponding to a layer specified for each SNR of the scalable-encoded data of the image signal, stored in the generated packet, as additional information of the generated packet.

The data transmission method may be configured such that the encoding step includes a step of generating scalable-encoded data by progressive encoding processing in which different color components are specified in a progressive order, and the packet generation step includes a step of specifying priority-level information corresponding to a layer specified for each color component of the scalable-encoded data of the image signal, stored in the generated packet, as additional information of the generated packet.

The data transmission method may further include a step of, in response to a packet re-transmission request sent from the data receiving apparatus, determining the levels of priority assigned to packets for which the re-transmission request has been sent; of determining whether re-transmission is to be performed according to the determined levels of priority, and of re-transmitting packets having higher levels of priority earlier, the step being executed by the data transmission apparatus.

The foregoing object is achieved in a further embodiment of the present invention through the provision of a received-data processing method for receiving packets which store encoded data and for executing data processing, including the steps of a receiving step of receiving packets which store data scalable-encoded by wavelet transform; a packet-priority-level-information determination step of determining whether the packets have the information of a level of priority equal to or larger than a value specified according to the processing performance of the data receiving apparatus; and a decoding step of decoding data stored in packets selected in the packet-priority-level-information determination step.

The received-data processing method may be configured such that the packet-priority-level-information determination step includes an IP-packet filtering step of determining a level of priority assigned to the IP header of each received packet, and an RTP-packet-header scanning step of determining a level of priority assigned to the RTP header of the received packet.

The foregoing object is achieved in a yet further embodiment of the present invention through the provision of a computer program for executing processing for storing image data in a packet and for sending the packet, including the steps of an encoding step of applying scalable-encoding processing by using wavelet transform to an image signal, and a packet generation step of generating a packet which stores scalable-encoded data generated in the encoding step and of specifying priority-level information corresponding to a layer of the scalable-encoded data of the image signal, stored in the generated packet, as additional information of the generated packet.

A computer program according to the present invention can be provided, for example, for general-purpose computer systems which can execute various program codes, by storage media, communication media, such as networks, and recording media, such as CDs, FDs, and MOs, in a computer-readable form. When the program is provided in a computer-readable form, the computer system executes processing according to the program.

Other objects, features, and advantages of the present invention will be made clear by more detailed descriptions based on embodiments and attached drawings. A system in the present specification refers to a logical combination of a number of apparatuses. The number of apparatuses are not necessarily disposed in the same cabinet.

BRIEF DESCRIPTION OF THE FIGURES

FIG. 7 is a view used for describing wavelet transform processing.

FIG. 8 is a view of the structure of data output from an encoder of a data transmission apparatus according to the present invention.

FIG. 14 is a view showing the structure of the IP header of a generated packet in the packetizer of the data transmission apparatus according to the present invention.

FIG. 15 is a view of a priority-level setting map used for specifying levels of priority for generated packets in the packetizer of the data transmission apparatus according to the present invention.

FIG. 16 is a view of another priority-level setting map used for specifying levels of priority for generated packets in the packetizer of the data transmission apparatus according to the present invention.

DETAILED DESCRIPTION OF THE INVENTION

System Outline and Data Transmission and Receiving Structure Example

An outline of a system and an example data transmission and receiving structure according to the present invention will be described first. An image-information distribution system according to the present invention executes scalable encoding by using wavelet transform. Hierarchical code such as JPEG-2000, based on wavelet transform, can have layers where resolutions are finely specified, and it is easy to specify layers corresponding to any bit rates determined by various data receiving terminals having different processing performance. Since a JPEG-2000 video stream, which is a compression format based on JPEG-2000 for motion images, is formed of a series of intra-frame data without any inter-frame correlation, even if a packet loss occurs on a network, an error is not propagated from the lost packet to other packets. Therefore, when the wavelet transform is used, since block noise does not occur, visual deterioration of image quality is suppressed. The present invention provides structures for scalable-encoding, packetizing, receiving, and decoding used when data to which the wavelet transform, which has the above characteristics, is applied is distributed through a communication network, such as the Internet.

A system according to the present invention, to be described below, performs scalable encoding by wavelet transform, and transmits and receives scalable-encoded data. Levels of priority are assigned to data in a number of layer levels according to an application and the network layer, and used. For example, data communication is performed with error control or rate control being executed according to levels of priority. With this structure, high-quality image communication is allowed in image data transfer on a network where a packet loss may occur.

Further, when data receiving terminals having various, different processing performance refers to levels of priority corresponding to layers specified in scalable-encoding processing performed by using wavelet transform to select necessary packets only, a data source can execute communication suited to the performance of terminals in heterogeneous environments to implement a scalable communication system.

Figure 1:
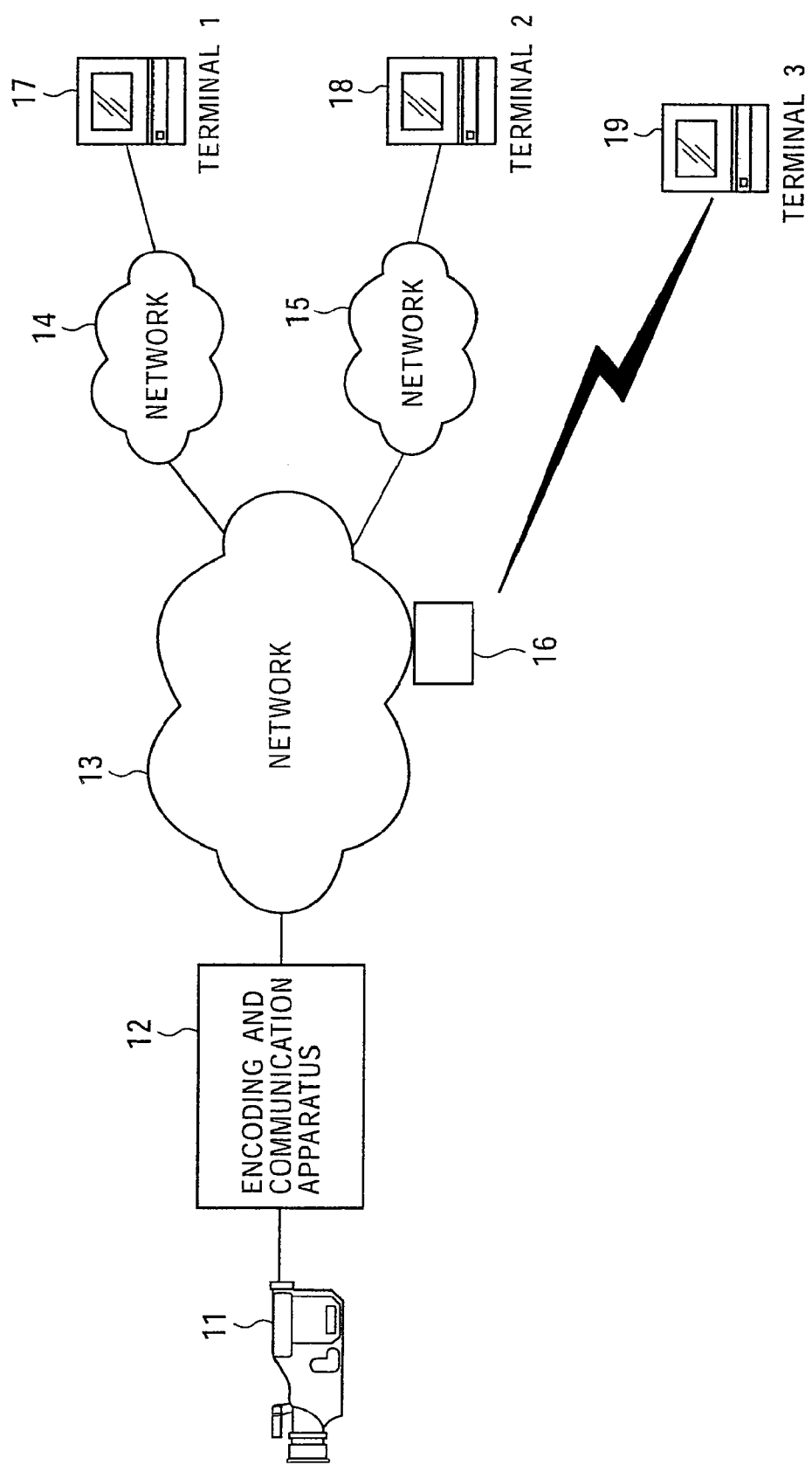
FIG. 1 is a view showing an example network structure to which a system according to the present invention is applied.

FIG. 1 shows a data transmission and receiving system according to an embodiment of the present invention. In FIG. 1, a video camera 11 serves as an input apparatus for a data receiving side. The video camera 11 is connected to an encoding and communication apparatus 12 at a data transmission site. In this system, it is assumed that networks are connected by the Internet Protocol (IP).

The encoding and communication apparatus 12 at the data transmission site executes scalable encoding processing based on the wavelet transform, packetizes (applies packet generation processing to) encoded data in each of a number of layers specified by the scalable encoding processing, and sends IP packets generated in this way to a network 13.

The network 13 sends the IP packets to a transmission destination according to address information specified in the IP packets. Various transmission forms are used. For example, packets are sent to a terminal 17 through a service provider network 14 which offers dial-up service, packets are sent to a terminal 18 through a service provider network 15 which uses ADSL, or packets are sent to a mobile terminal 19 through a base station 16 by a radio network.

Each of the data receiving terminals 17, 18, and 19 reports to the encoding and communication apparatus 12 quality of service (QoS) information, such as the information of data rates at which the terminal can connect to a network, decoding possibility of encoded data received in the range of the data rates, and a resolution at which the terminal can display data, and a bit rate corresponding to the CPU performance of the terminal. The encoding and communication apparatus 12 determines a layer(s) to which information is to be sent, according to the available bandwidths of the networks to be used and the QoS information received from each of the data receiving terminals 17, 18, and 19, as terminal-performance information, and sends necessary packets to each terminal.

When data is distributed by a unicast method, each of the terminals 17, 18, and 19 receives all packets sent to the terminal from the encoding and communication apparatus 12. When data is distributed by a multicast method, each terminal receives packets having a level of priority equal to or lower than that requested by the terminal. The terminals 17, 18, and 19 execute packet selection processing according to the information of the level of priority attached to each packet by the encoding and communication apparatus 12. Details of the processing will be described later.

Figure 2:
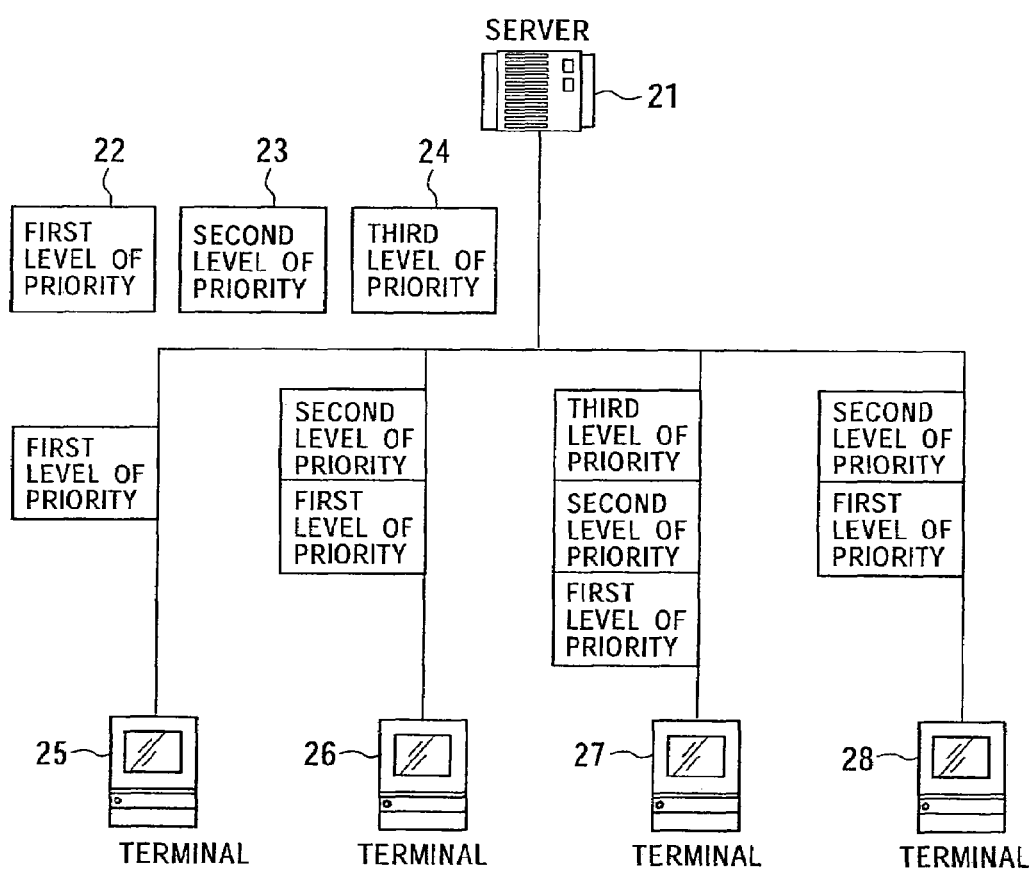
FIG. 2 is a view showing an example packet distribution based on levels of priority in a network structure to which a system according to the present invention is applied.

The execution of packet selection and receiving is effective in the terminals 17, 18, and 19 when, for example, a band width is provided wider than required by terminal performance and topology is used such as a LAN in which terminals are connected through a bus. FIG. 2 shows example data distribution in a bus-type LAN. In FIG. 2, a server 21 performs scalable encoding and sends packetized data for each layer through a bus. It is assumed that the server 21 outputs packets 22, 23, and 24, and they have a first level, a second level, and a third level of priority. The levels of priority are assigned to layers in a descending order from the most important layer. The packet having the first level of priority includes encoded data of the most important layer, and the packet having the third level of priority includes encoded data of the least important layer.

The encoded data of the most important layer is basically required to display images for both of a terminal having a low-resolution display and a low processing performance and a terminal having a high-resolution display and a high processing performance. The encoded data of a layer having a low level of priority is effective, for example, when a high-quality image data is displayed on a high-resolution display, but is meaningless for data display in a low-resolution display. Details will be described later.

The level of priority of each packet on the bus is detected, and only packets required according to the performance of each terminal, such as its resolution or the processing performance of its CPU, are decoded to allow scalable distribution. In FIG. 2, a terminal 25 selectively receives the packet having the first level of priority, a terminal 26 receives the packets having the first and second levels of priority, a terminal 27 receives the packets having the first, second, and third levels of priority, and a terminal 28 receives the packets having the first and second levels of priority. In this case, the terminal 27 has the highest resolution and the highest CPU processing performance. Each terminal decodes encoded data included in the packet(s) selectively received to display data.

Figure 3:
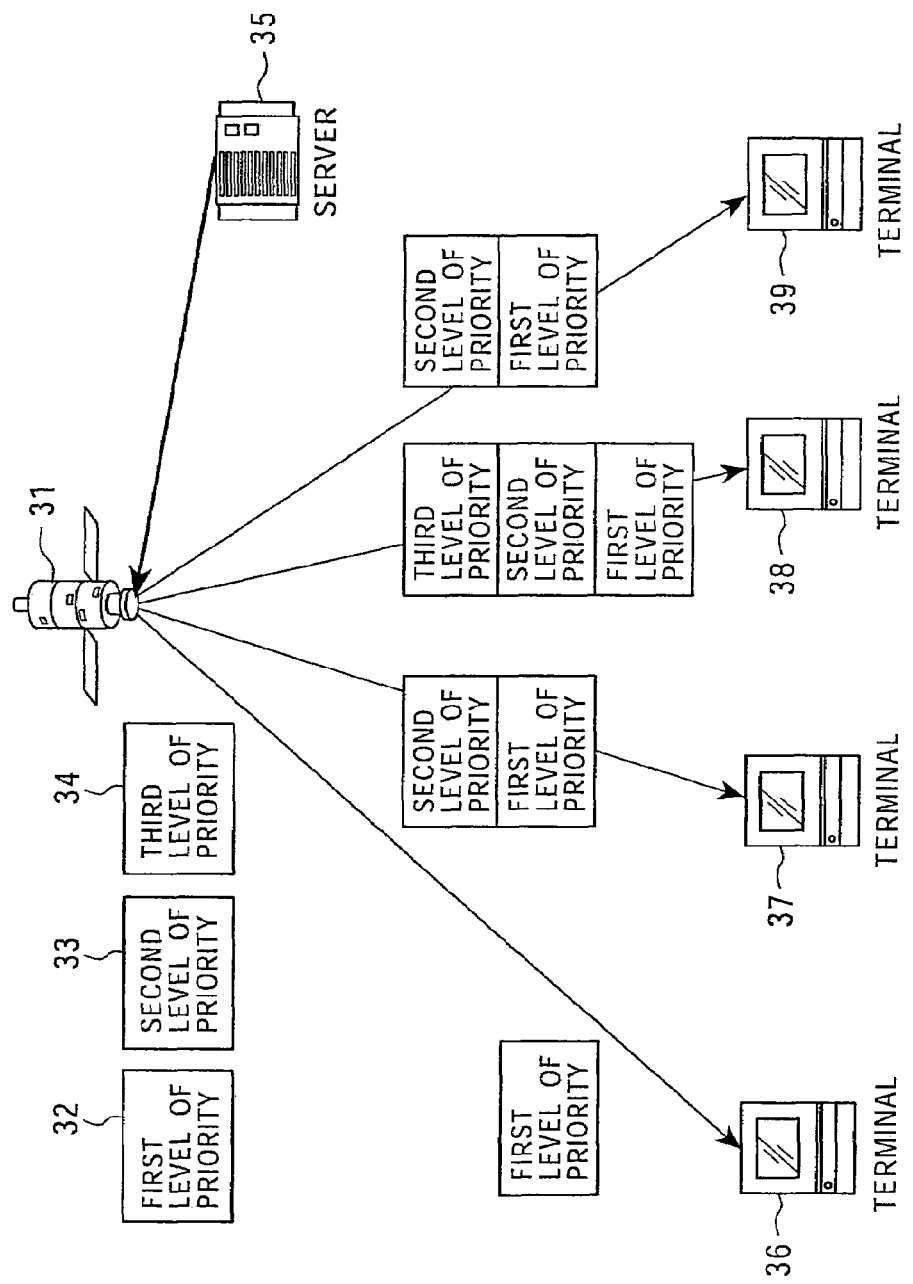
FIG. 3 is a view showing an example packet distribution based on levels of priority through a satellite, to which a system according to the present invention is applied.

Alternatively, also in a broadcasting system which uses a satellite, scalable communication is possible when receivers receive only packets suited to their performance. FIG. 3 shows an example broadcasting system which uses a satellite. A server 35 executes scalable encoding processing based on the wavelet transform, packetizes (applies packet generation processing to) encoded data in each of a number of layers specified by the scalable encoding processing, and sends generated packets to a satellite 31. Each of terminals 36 to 39 receives packets having the level(s) of priority required according to the performance of the terminal through the satellite 31.

In FIG. 3, the same processing as that shown in the LAN of FIG. 2 is shown. It is assumed that the server 35 outputs packets 32, 33, and 34, and they have a first level, a second level, and a third level of priority. The packet having the first level of priority includes encoded data of the most important layer, and the packet having the third level of priority includes encoded data of the least important layer.

The level of priority of each packet is detected, and only packets required according to the performance of each terminal, such as its resolution or the processing performance of its CPU, are decoded. In FIG. 3, the terminal 36 selectively receives the packet having the first level of priority, the terminal 37 receives the packets having the first and second levels of priority, the terminal 38 receives the packets having the first, second, and third levels of priority, and the terminal 39 receives the packets having the first and second levels of priority. Each terminal decodes encoded data included in each packet to display data.

[Structure and Processing of Data Transmission Site]

Figure 4:
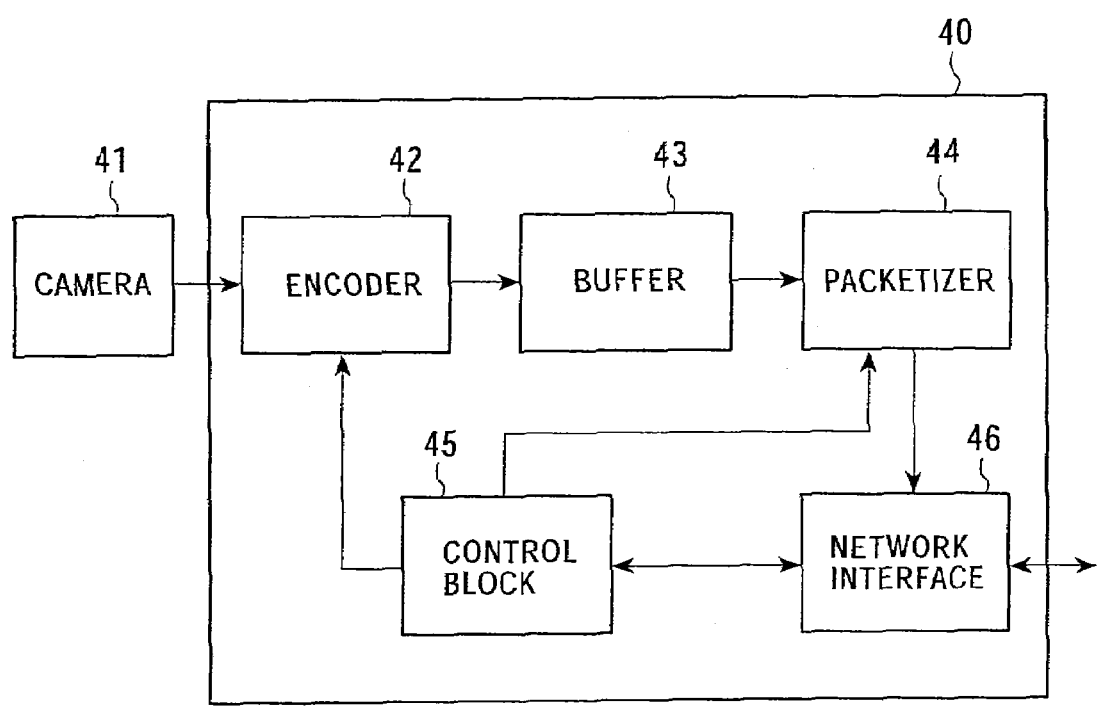
FIG. 4 is a block diagram of a data transmission apparatus according to the present invention.

The structure and processing of the data transmission site in the system according to the present invention will be described next. The data transmission site generates encoded data, packetizes the data, and sends it; in other words, executes encoding processing, packet generation, and packet transmission processing. FIG. 4 is a block diagram of the encoding and communication apparatus of the data transmission site in the system according to the present invention. In FIG. 4, a camera 41 is used as an input apparatus of data to be encoded. Images and audio signals obtained by the camera 41 are input to an encoder 42. Data to be encoded is, not limited to data obtained by the camera. It may be data stored in various storage media, such as a DVD, a CD, and a hard disk or data received from other servers.

The encoder 42 applies the wavelet transform as encoding. The encoder 42 executes progressive encoding processing in a progressive order specified in advance. More specifically, the encoder 42 executes scalable encoding progressively based on spatial resolutions, signal-to-noise ratios (SNRs), that is, image quality, or color components (such as R, G, and B components, or Y, Cb, and Cr components), and temporarily stores encoded data in a buffer 43.

Progressive encoding is frequently used for image distribution on the Internet, and allows a data receiving terminal to display a coarse image first, and then gradually finer images. In progressive encoding based on spatial resolutions, low-frequency-image data corresponding to a coarse image is encoded and then high-frequency-image data corresponding to finer images is encoded. A receiving terminal first decodes the encoded low-frequency-image data and displays the coarse, rough image on a display within a short period. Then, the receiving terminal decodes the encoded high-frequency-image data and displays finer images gradually. In progressive encoding based on SNRs, that is, based on image quality, low-SNR (low-quality) data is distinguished from high-SNR (high-quality) data and encoded. In progressive processing based on color components (R, G, and B components or Y, Cb, and Cr components), each color component is encoded.

Figure 5:
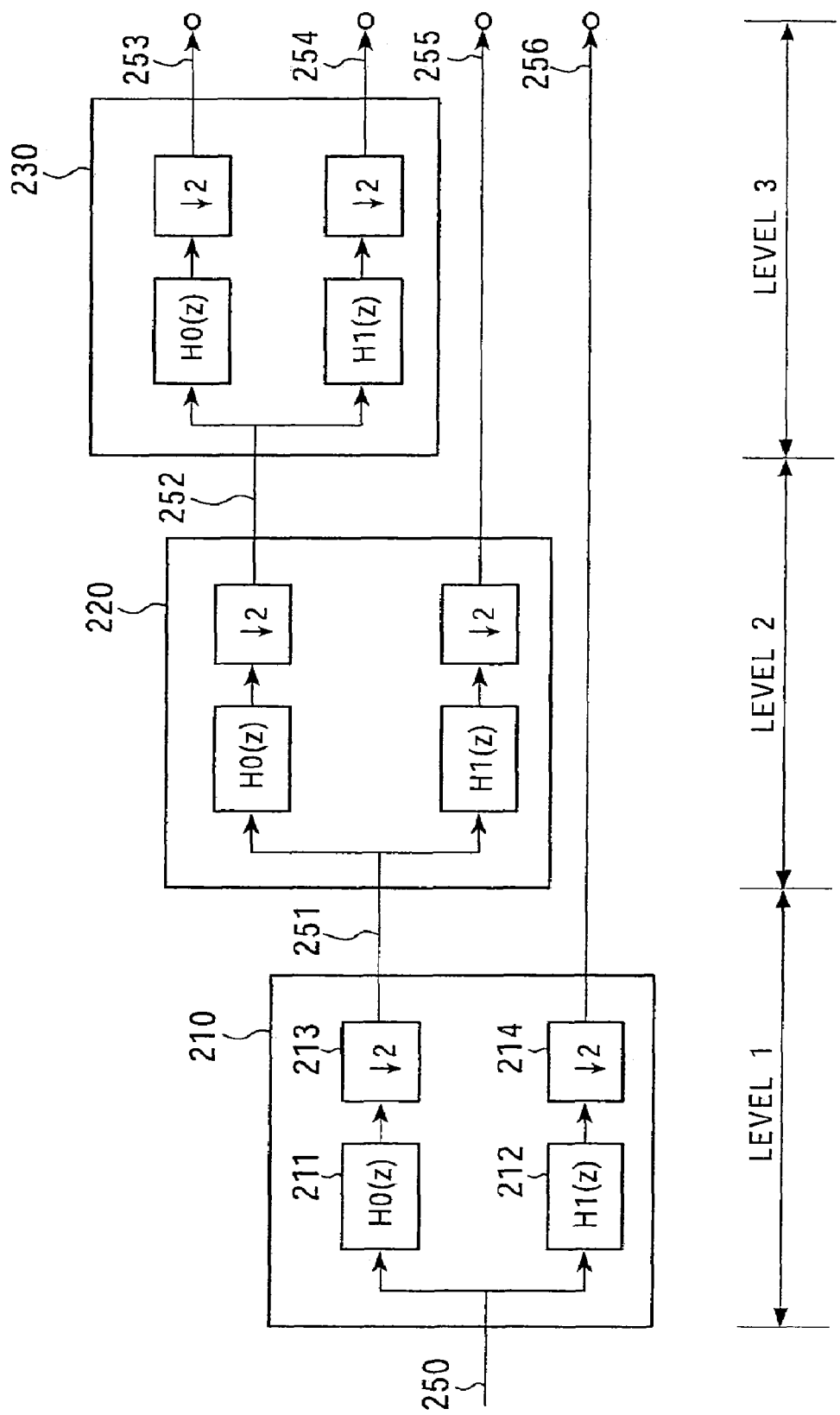
FIG. 5 is a view showing an example encoding-processing structure which uses wavelet transform.

FIG. 5 shows an example structure of the encoder 42, which executes the wavelet transform. Octave division, which is the most general wavelet transform among several wavelet transform methods, is applied to a number of levels. In FIG. 5, the number of levels is three (level 1 to level 3), an image signal is divided into a low-frequency component and a high-frequency component, and only the low-frequency component is divided hierarchically. For convenience, wavelet transform is applied to a one-dimensional signal (such as the horizontal component of an image) in FIG. 5. When the wavelet transform is extended two dimensionally, a two-dimensional image signal can be handled.

The operation of the encoder 42 will be described next. An input image signal 250 to a wavelet transform section is divided in band by a low-pass filter 211 (having a transfer function $H0(z)$) and a high-pass filter 212 (having transfer function $H1(z)$), and resolutions in the obtained low-frequency component and high-frequency component are halved (level 1) by down samplers 213 and 214. The outputs thereof are an L component 251 and an H component 256, where L indicates a low frequency, and H indicates a high frequency. The low-pass filter 211, the high-pass filter 212, and the two down samplers 213 and 214 form a level-1 circuit section 210 in FIG. 5.

Only the low-frequency component signal output from the down sampler 213, of the signals thinned out by the down samplers 213 and 214 is further divided in band by a low-pass filter and a high-pass filter of a level-2 circuit section 220. The resolutions of the signals output from the filters are halved (level 2) by down samplers. The level-2 circuit section 220, formed of the low-pass filter, the high-pass filter, and the down samplers, has the same structure as the level-1 circuit section 210, formed of the low-pass filter 211, the high-pass filter 212, and the down samplers 213 and 214.

The above processing is performed to a predetermined level to divide in band low-frequency components hierarchically to sequentially generate band components. Band components generated in level 2 are an LL component 252 and an LH component 255. FIG. 5 shows band divisions performed to level 3. The output of the down sampler connected to the low-pass filter in the level-2 circuit section 220 is sent to a level-3 circuit section 230 which has the same structure as the level-1 circuit section 210. When band divisions are performed to level 3 in this way, an LLL component 253, an LLH component 254, the LH component 255, and the H component 256 are generated.

Figure 6:
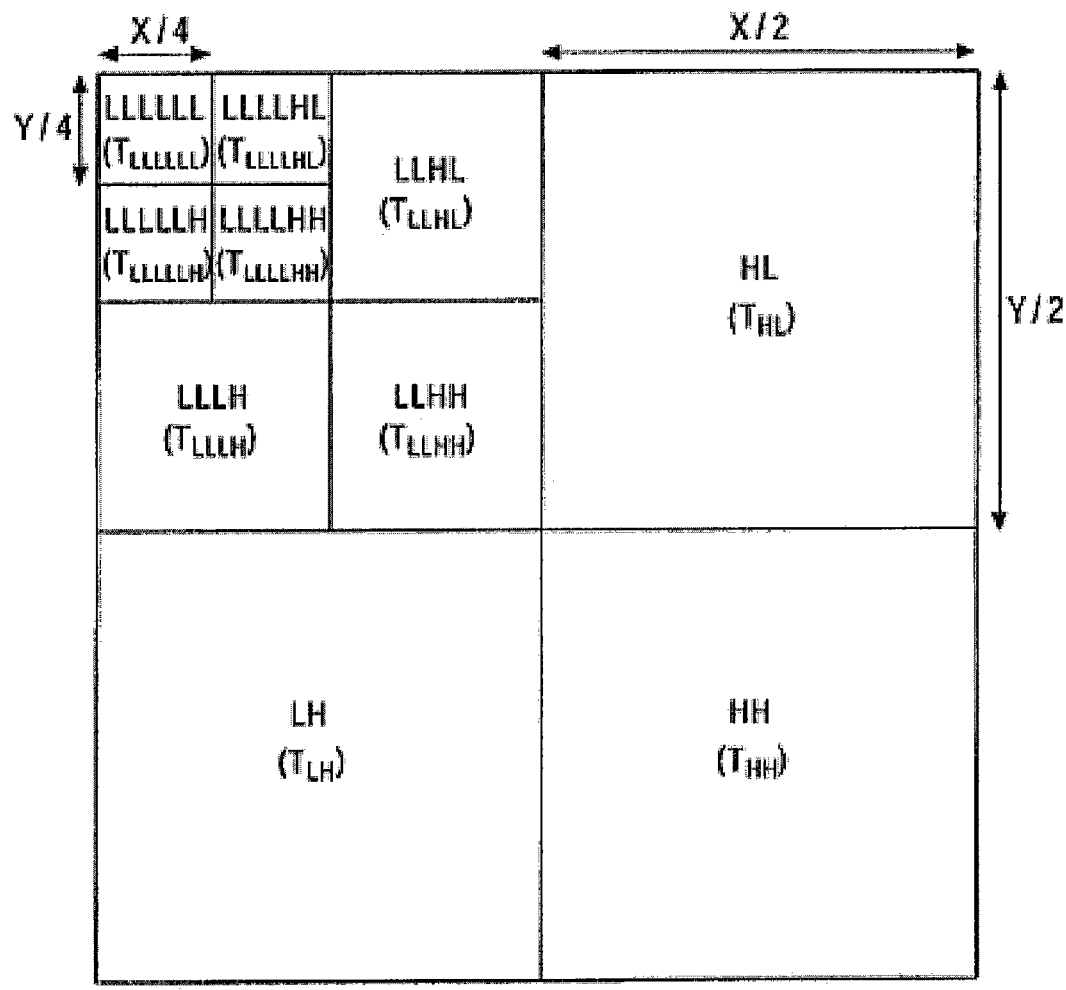
FIG. 6 is a view used for describing wavelet transform processing.

FIG. 6 shows band components obtained when a two-dimensional image is divided in band to level 3. The notation of "L" and "H" in FIG. 6 differs from that in FIG. 5, which handles a one-dimensional signal. In FIG. 6, a two-dimensional signal is divided in band (horizontally and vertically) at level 1 into four components LL, LH, HL, and HH, where LL indicates that horizontal and vertical parts are both L, and LH indicates that a horizontal part is H and a vertical part is L. Then, the LL component is further divided in band to generate LLLL, LLHL, LLLH, and LLHH components. Further, the LLLL component is again divided in band to generate LLLLLL, LLLLHL, LLLLLH, and LLLLHH components.

The encoder 42 shown in FIG. 4 executes the above-described wavelet transform processing. Data encoded by the encoder 42 is stored in the buffer 43 at each layer level. Layer level divisions based on spatial resolutions of data to which the wavelet transform is applied will be described by referring to FIG. 7. A structure shown in FIG. 7 corresponds to the data structure shown in FIG. 6. FIG. 7 shows a case in which a division process is performed three times in the wavelet transform, as described by referring to FIG. 6.

The most-important layer level of data is required for displaying a coarse and rough image on a display, and corresponds to an encoding area which includes a low-frequency component (3LL); that is, data areas 701 to 704 i having a size of one eighths in total. The next-important layer level of data corresponds to next-lower-frequency data areas 701 to 707 having a size of one fourth in total. The still-next-most-important layer level of data corresponds to still-next-lower-frequency data areas 701 to 710 having a half size in total.

The data layer-encoded in this way is output to and stored in the buffer 43. FIG. 8 shows the structure of the data output from the encoder 42.

The structure of the data output from the encoder 42, shown in FIG. 8, will be described next. The output data starts with a start-of-code-stream (SOC) maker indicating the start of code data, a main header follows in which an encoding parameter, a quantization parameter, and a progressive order are described, and then encoded data follows. The encoded data has a hierarchical structure. At the end of the code data, an end-of-code-stream (EOC) maker indicating the end of the code data is disposed.

A packetizer 44 serving for packet generation analyzes the encoded data stored in the buffer 43, determines partitions according to the contents of the data, and packetizes the data. The packetizer 44 uses the main header in the data stored in the buffer 43 to obtain the progressive-order information of the encoded data, the number of layers, and information related to color components. The packetizer 44 reads these pieces of field information to analyze the layer structure. Layer-level structures include a progressive structure based on spatial resolutions, a progressive structure based on SNRs, that is, image quality, and a progressive structure based on color components (R, G, and B components or Y, Cb, and Cr components).

Packet generation processing and processing for attaching levels of priority to packets performed in the packetizer 44 will be described next by referring to FIG. 9. Data is input from the camera 41 to the encoder 42. The encoder 42 applies scalable encoding to the data according to the wavelet hierarchical structure and stores encoded data in the buffer 43. The packetizer 44 reads the main header of the encoded data stored in the buffer 43 to obtain the progressive order information, the number of layers, and information related to color components, partitions the encoded data according to the obtained information in each layer, and applies packet generation processing to the partitioned data.

Three example layer structures based on progressive orders defined in JPEG-2000 and their corresponding example packet structures will be described next.

Figure 10:
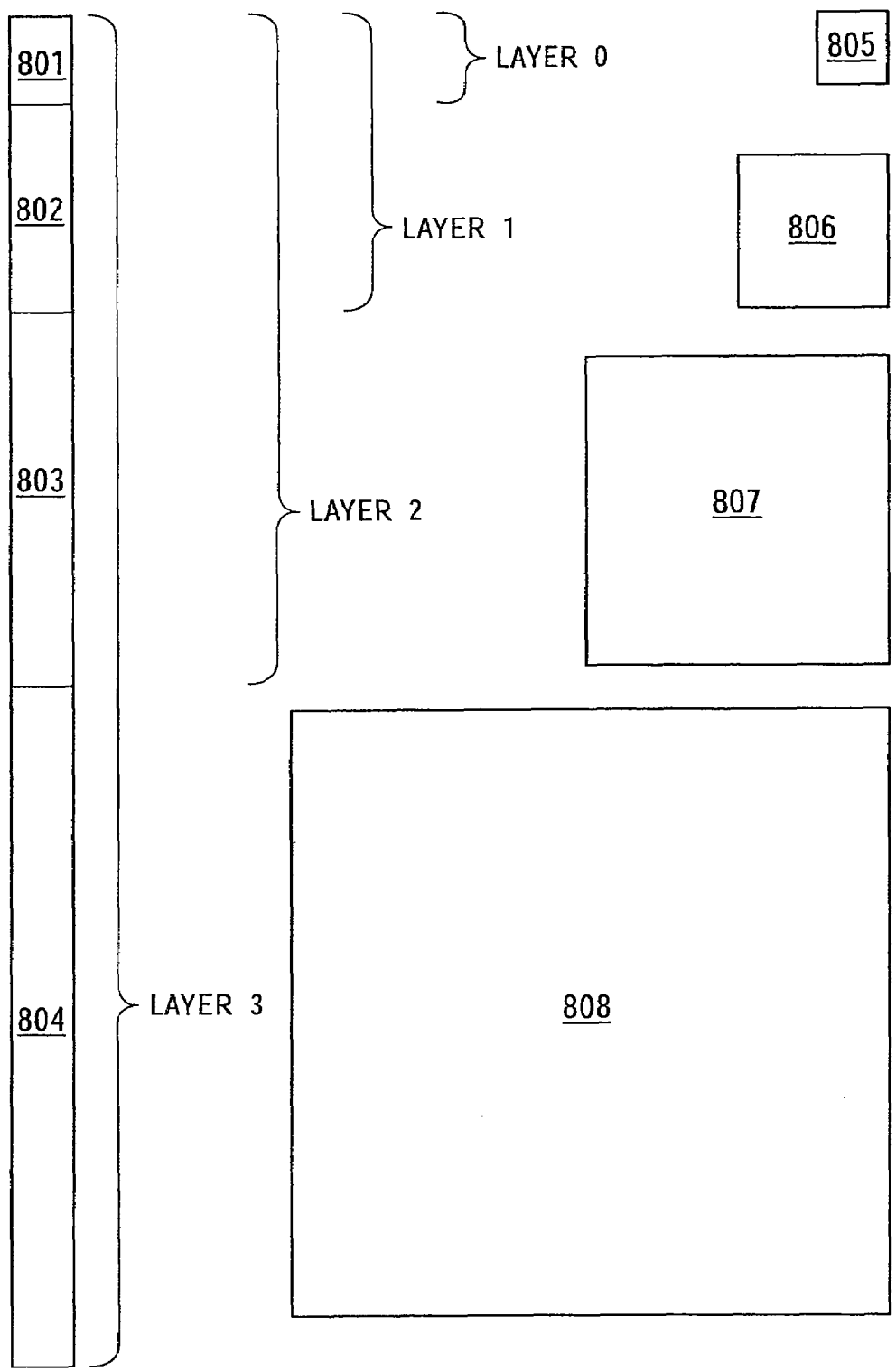
FIG. 10 is a view showing packet generation processing with spatial resolutions being specified in progressive layers, taken as an example processing in the packetizer of the data transmission apparatus according to the present invention.

FIG. 10 is a view showing a case in which data encoded according to a progressive order of spatial resolutions is associated with packets in each layer. An image of one frame is formed of packets 801 to 804. When encoded data stored in the packet 801 is decoded, an image 805 having a spatial resolution one eighth that of the original is obtained. The packet 801 includes encoded data having the highest level of priority, and is required to display a coarse image first on the display of a data receiving terminal which executes decoding. When encoded data stored in the packet 801 and the packet 802 is decoded, an image 806 having a spatial resolution one fourth that of the original is obtained. When encoded data stored in the packets 801 to 803 is decoded, an image 807 having a spatial resolution half that of the original is obtained. When encoded data stored in the packets 801 to 804 is decoded, an image 808 having the same spatial resolution as the original is obtained.

The priority order of the four packets 801 to 804 shown in FIG. 10 is the packet 801, the packet 802, the packet 803, and the packet 804. When scalable-encoded data is generated by progressive encoding processing with a progressive order of different spatial resolutions, as shown in FIG. 10, the packetizer 44 executes processing for setting priority-level information corresponding to each spatial-resolution layer of encoded data of an image signal, stored in generated packets, as additional information of the generated packets.

Figure 11:
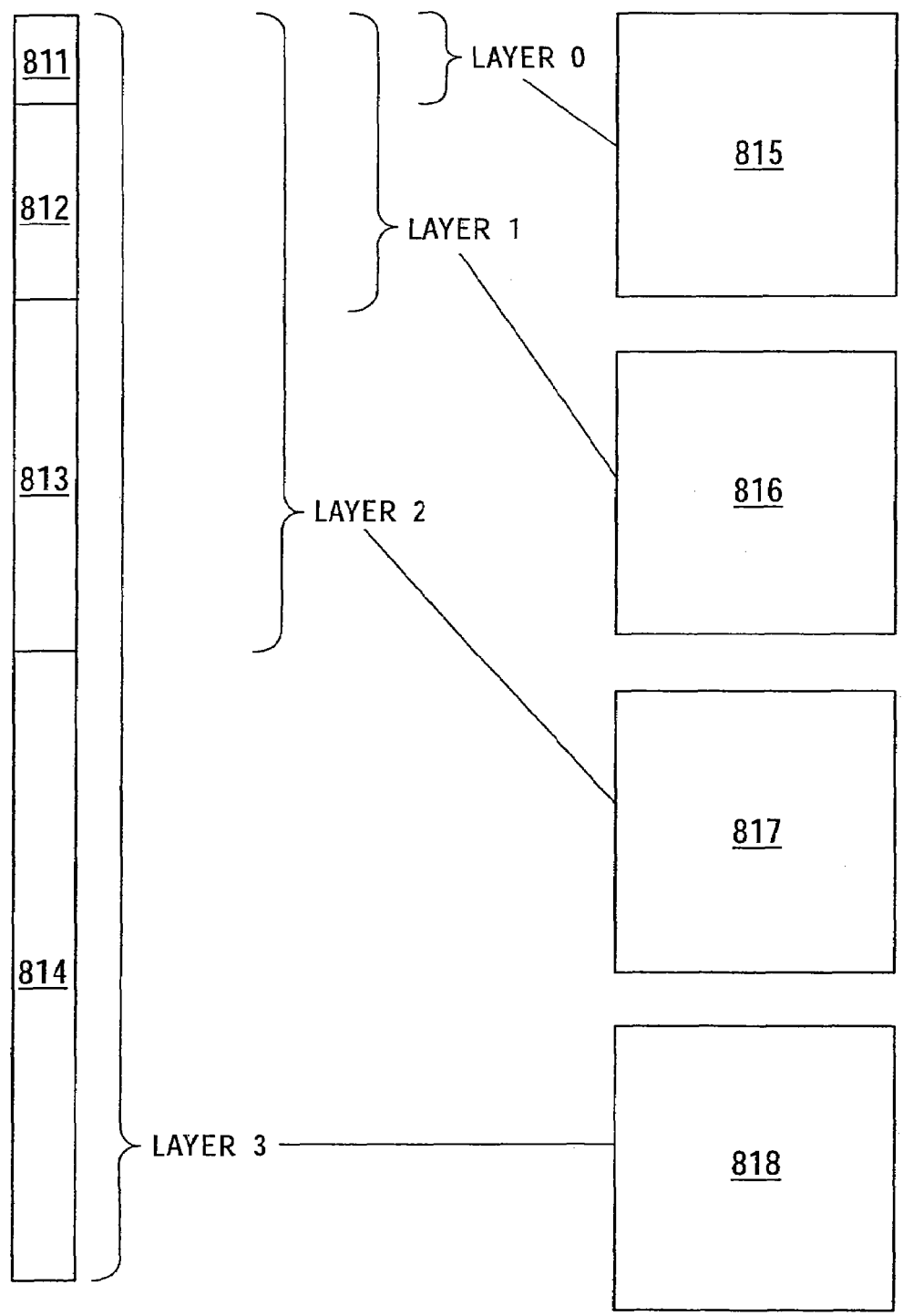
FIG. 11 is a view showing packet generation processing with image quality (SNRs) being specified in progressive layers, taken as an example processing in the packetizer of the data transmission apparatus according to the present invention.

FIG. 11 is a view showing a case in which data encoded according to a progressive order of SNRs (image quality) is associated with packets in each layer. An image of one frame is formed of packets 811 to 814. When encoded data stored in the packet 811 is decoded, an image 815 having the same spatial resolution as the original low-quality image is obtained. When encoded data stored in the packet 811 and the packet 812 is decoded, an image 816 having a higher image-quality than the decoding result of the encoded data stored in the packet 811 is obtained. When encoded data stored in the packets 811 to 813 is decoded, an image 817 having a further higher image-quality with lower noise is obtained. When encoded data stored in the packets 811 to 814 is decoded, an image 818 having the highest image quality is obtained.

The priority order of the four packets 811 to 814 shown in FIG. 11 is the packet 811, the packet 812, the packet 813, and the packet 814. When scalable-encoded data is generated by progressive encoding processing with a progressive order of different SNRs, as shown in FIG. 11, the packetizer 44 executes processing for setting priority-level information corresponding to each SNR layer of encoded data of an image signal, stored in generated packets, as additional information of the generated packets.

Figure 12:
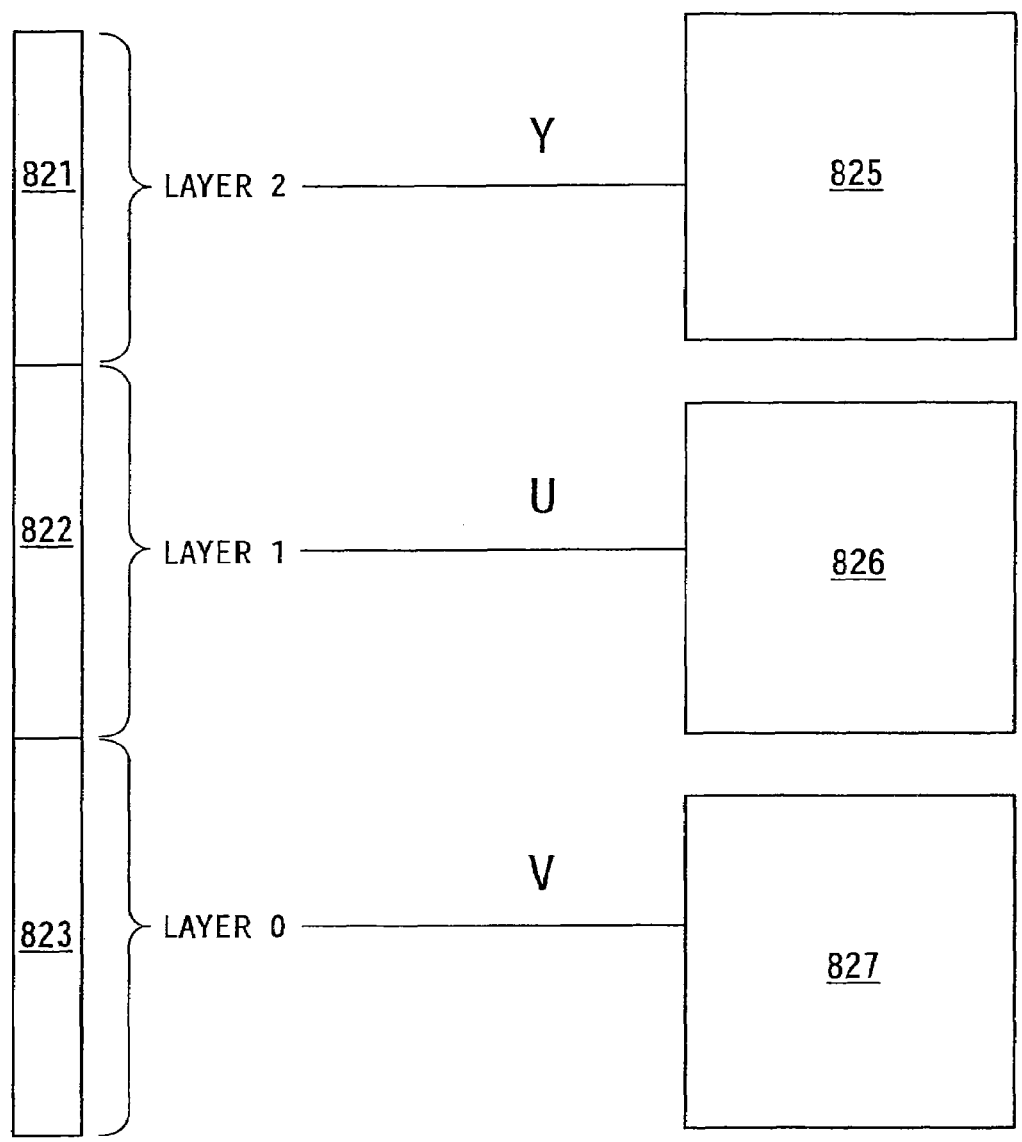
FIG. 12 is a view showing packet generation processing with color components being specified in progressive layers, taken as an example processing in the packetizer of the data transmission apparatus according to the present invention.

FIG. 12 is a view showing a case in which data encoded according to a progressive order of color components is associated with packets in each layer. An image of one frame is formed of packets 821 to 823. When encoded data stored in the packet 821 which includes Y-component encoded data is decoded, a black-and-white image 825 is obtained. When encoded data stored in the packet 821 and the packet 822 is decoded, a color image 826 which includes a U component is obtained. When encoded data stored in the packets 821 to 823 is decoded, a color image 827 which includes a V component is obtained.

The priority order of the three packets 821 to 823 shown in FIG. 12 is the packet 821, the packet 822, and the packet 823. When scalable-encoded data is generated by progressive encoding processing with a progressive order of different color components, as shown in FIG. 12, the packetizer 44 executes processing for setting priority-level information corresponding to each color-component layer of encoded data of an image signal, stored in generated packets, as additional information of the generated packets.

The packetizer 44 executes processing for generating (IP) packets in which encoded data in each layer serves as a payload. A real-time transport protocol (RTP) is used as a real-time transmission and receiving protocol of image and audio data in an IP network.

Figure 13:
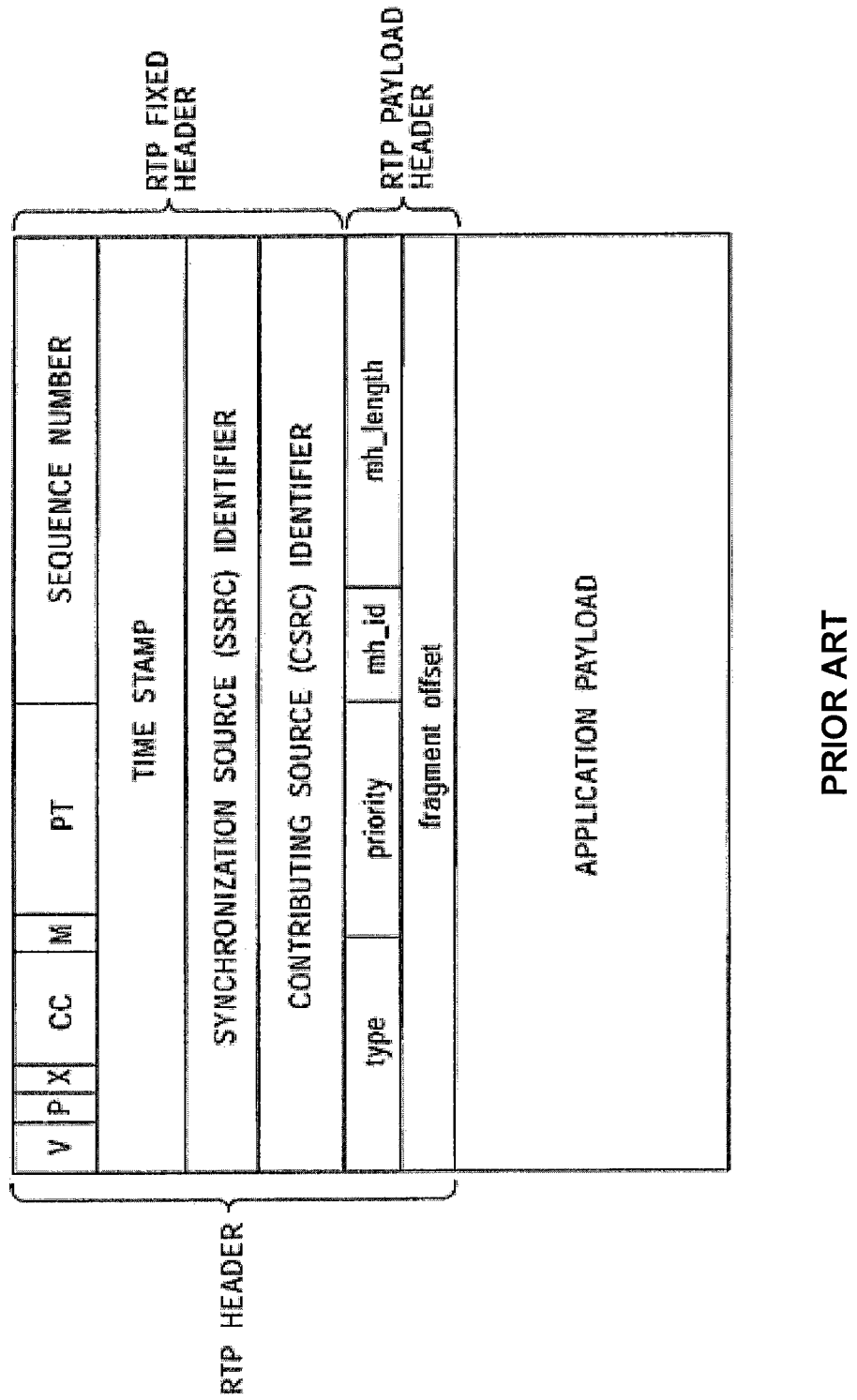
FIG. 13 is a view showing the structure of the RTP header of a generated packet in the packetizer of the data transmission apparatus according to the present invention.

The packetizer 44 adds an RTP payload header for a JPEG-2000 video stream to a payload partitioned in each layer as a part of an RTP header, and further adds an RTP fixed header to make a packet. FIG. 13 shows the RTP payload header for a JPEG-2000 video stream and the RTP fixed header. A flag indicating a level of priority is included in the RTP payload header of a packet which accommodates data packetized in layer. The level of priority is stored in a [priority] field of the RTP payload header.

When data encoded according to a progressive order is packetized, if an image of one frame is formed of packets 801 to 804 as shown in FIG. 10, the highest level of priority is assigned to the packet 801, which generates the image 805 having a spatial resolution one-eighths that of the original, and levels of priority are assigned in a descending order to the packet 802, the packet 803, and the packet 804. The level of priority is stored in the [priority] field of the RTP payload header of each packet.

The structure of the RTP payload header shown in FIG. 13 will be described. A [type] field indicates the type of a packet carried, by RTP in a JPEG-2000 video stream. To define a packet format other than that used in the present case, the value of the field is changed appropriately.

The [priority] field indicates the degree of importance of the RTP packet as described above, and is determined according to an application or service used.

An [mh_id] field indicates the identifier of each JPEG2000 main header, and is used to prevent the packet from, being unable to be decoded when a packet which includes the main header is lost. A [mh_length] field indicates the length of the JPEG-2000 main header, and is used as an offset for detecting the loss of the main header or for detecting packets following the main header. A [fragment offset] field indicates the offset of the packet from the starting byte of the JPEG-2000 data carried by the RTP packets.

The RTP fixed header includes the fields of a version number (V), padding (P) whether an extension header (X) is disposed, the number (CC) of transmission sources, marker information (M), a payload type (PT), a sequence number, an RTP time stamp, a synchronization source (SSRC) identifier, and a contributing source (CSRC) identifier. The time stamp specified in the RTP header is used to control a processing time when the RTP packet is developed, allowing the reproduction of a real-time image or sound to be controlled. A number of scalable-encoded data items, which are compressed, can be stored in an IP packet.

An IP header is further added to the packet to which the RTP header has been added. FIG. 14 shows details of the IP header in an IP packet. The IP header includes a version, such as IPv4 or IPv6, a header length, a type-of-service (TOS) field which stores priority-level information, a packet length, an identification, a flag indicating control information related to data division (fragment) in an IP layer, a fragment offset indicating the location of divided (fragmented) data, time to live (TTL) indicating the information of time until the data is discarded, a protocol (IP: 4, TCP: 7, UDP: 17, . . . ) used in an upper layer, a header checksum, a source IP address, and a destination IP address.

A flag indicating a level of priority to be processed by a receiving side may be added in the IP header, in addition to the level of priority specified in the RTP payload header. For example, in IPv4, a level of priority is indicated in the TOS field, and priority control is possible for packets having levels of priority in a DiffServ network. In IPv6, it is possible to indicate a level of priority in a flow label. In this way, when a different protocol is used in the network layer, the value indicating a level of priority also differs. Therefore, it is preferred that relationships among encoder layers, levels of priority of packets with an application used taken into account, and a level of priority in the network layer be specified. A control block 45 performs such a control. The packetizer 44 may execute priority-level setting processing under the control of the control block 45 according to a setting corresponding to the network protocol. Alternatively, levels of priority may be set according to QoS received from a receiving terminal or may be dynamically changed according to a network condition.

IP packets generated by the packetizer 44 are output from the communication system through a network interface 46. DiffServ is service proposed in IETF. In DiffServ, a router changes a packet processing method according to a level of priority specified in the TOS field of an IP header. The objective of this service is to increase the quality of the network by placing priority on real-time sound and images over usual data in processing, and discarding a packet having a lower level of priority when congestion occurs in a router and packets need to be discarded.

A method for assigning levels of priority to an RTP header which include an RTP payload header and to an IP header will be described next. When data encoded according to the progressive order of spatial resolutions shown in FIG. 10 is packetized, a higher level of priority is assigned to a packet which includes a lower-resolution encoded data, and a lower level of priority is assigned to a packet which includes a higher-resolution encoded data. When data encoded according to the progressive order of SNRs (image quality) shown in FIG. 11 is packetized, a higher level of priority is assigned to a packet which includes a lower-SNR (image quality) encoded data, and a lower level of priority is assigned to a packet which includes a higher-SNR (image quality) encoded data. When data encoded according to the progressive order of color components shown in FIG. 12 is packetized, a higher level of priority is assigned to a packet which includes a Y-component encoded data, and a lower level of priority is assigned to a packet which includes a U-component or V-component encoded data.

Figure 9:
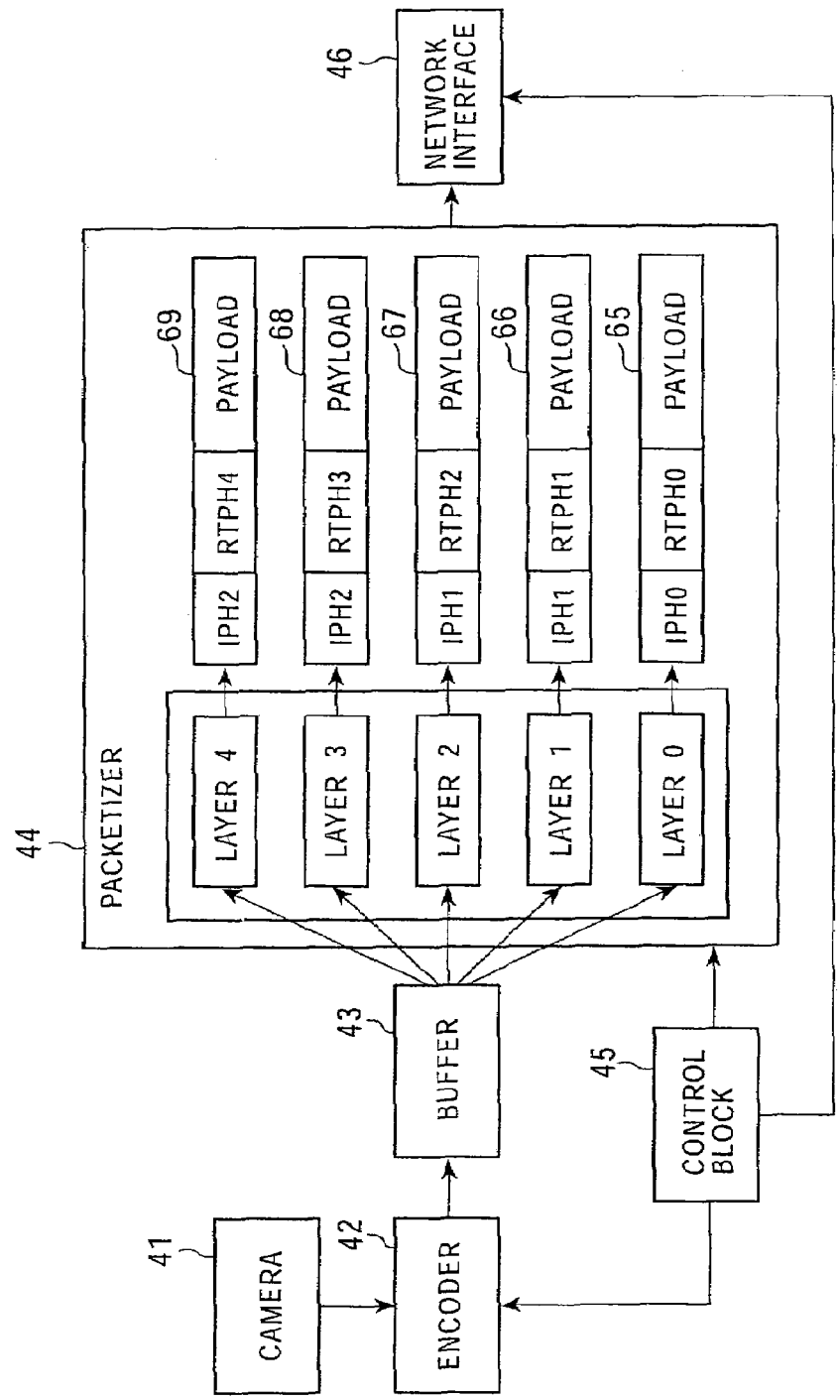
FIG. 9 is a view showing example processing in a packetizer of the data transmission apparatus according to the present invention.

For example, levels of priority are specified by the packetizer 44 as shown in FIG. 9. The packetizer 44 divides data scalable-encoded by the encoder 42 into layer-0 to layer-4 encoded data, and stores in five packets 65 to 69 as payloads.

Since the layer-0 encoded data is the most important, a level [0] of priority is assigned to the RTP header (RTPH) of the IP packet 65, which has the layer-0 encoded data as a payload, and the level [0] of priority is assigned to its IP header (IPH). Since the layer-1 encoded data is the next most important, a level [1] of priority is assigned to the RTP header (RTPH) of the IP packet 66, which has the layer-1 encoded data as a payload, and the level [1] of priority is assigned to its IP header (IPH). A level [2] of priority is assigned to the RTP header (RTPH) of the IP packet 67, which has the layer-2 encoded data as a payload, and the level [1] of priority is assigned to its IP header (IPH). A level [3] of priority is assigned to the RTP header (RTPH) of the IP packet 68, which has the layer-3 encoded data as a payload, and the level [2] of priority is assigned to its IP header (IPH). A level [4] of priority is assigned to the RTP header (RTPH) of the IP packet 69, which has the layer-4 encoded data as a payload, and the level [2] of priority is assigned to its IP header (IPH).

The priority-level setting processing for IP headers and RTP headers is, for example, executed according to a priority-level setting map stored in storage parts of the packetizer 44. FIG. 15 shows an example priority-level setting map. In the priority-level setting map, levels of priority assigned to an RTP header and an IP header are associated with each layer of data encoded by the encoder 42.

In the example priority-level setting map shown in FIG. 15, the levels 0 to 4 of layers set in the wavelet transform are used as they are as the levels 0 to 4 of priority assigned to the extension headers (RTP payload headers following RTP fixed headers) of RTP packets. The three levels 0 to 2 of priority are assigned to IP headers, so that three levels of priority are specified when viewed from the IP network. When layer levels are associated with levels of priority in RTP and the levels of priority in RTP are mapped onto those in IP in this way, the following control, for example, is made possible.

Since the sequence numbers of packets are controlled in RTP, if a packet is lost on the Internet, the lost packet can be detected. When the packet loss is detected, the receiving side can, for example, report the position of the packet loss to a decoder to change an error control method. A forward error correction (FEC) method is, for example, used as an error control method. A method for applying FEC to a packet loss in AAL1 of ATM or a method similar to a method in which a matrix described in the specification of the types 1 and 2 of B-ISDN ATM adaptation layer (AAL) in ITU-T Recommendation 1.363.1 is generated to apply ReedSolomon decoding to the lost packet can be used.

When the receiving side detects a packet loss, the receiving side can report the lost packet to the data transmission side and request the data transmission side to send again the lost packet. In this case, the receiving side can execute recovery processing by obtaining the lost packet by re-transmission.

This type of processing is not necessarily performed uniformly for packets of all layer levels. For example, the redundancy of forward error correction may be changed according to the bandwidth of a network, or the number of times re-transmission is performed may be weighted according to a level of priority.

The packetizer may always use the priority-level setting map shown in FIG. 15 in a fixed manner. Alternatively, the packetizer may dynamically change the priority-level setting map according to a network condition. To dynamically change the priority-level setting map according to a network bandwidth, for example, a method for monitoring a bandwidth at the transmission side and the receiving side, or a method for measuring the loss rate of transmission packets by RTCP may be used. Then, mapping can be changed with a transmission bandwidth and quality which can be assured being taken into account. When a priority-level setting map which maps layer levels onto levels of priority in RTP packets, or onto levels of priority in IP packets is generated, levels of priority can be determined with a network loss rate which determines the effect of a loss on the original image being taken into account.

As described above, since levels of priority corresponding to the layer levels of encoded data are set in the RTP payload headers of RTP headers in the data transfer processing according to the present invention, a level of priority depending on an upper-layer application can be understood in RTP, and therefore processing for a packet loss can be changed.

A process for each layer level depends on the application used, and a process to be performed according to levels of priority may be determined only in RTP. In the same way, the processing method can be changed with levels of priority being assigned in IP. In this case, since this is a function offered by a network, such as DiffServ, in IP, levels of priority in RTP packets are mapped onto levels of priority in IP packets to specify levels of priority supported by the network, or determined by the network.

In the priority-level setting map shown in FIG. 15, five levels of priority are specified in RTP packets, and three levels of priority are specified in IP packets. The level 0 of priority in RTP packets corresponds to the level 0 of priority in IP packets, the levels 1 and 2 of priority in RTP packets correspond to the level 1 of priority in IP packets, and the levels 3 and 4 of priority in RTP packets correspond to the level 2 of priority in IP packets. The number of levels of priority which can be handled by DiffServ is small in the current IPv4 format, but a process corresponding to three levels of priority can be performed with the mapping used in the present case being applied.

When data encoded according to the progressive order of spatial resolutions shown in FIG. 10 is packetized, for example, a higher level of priority is assigned to a packet which includes lower-resolution encoded data, and a lower level of priority is assigned to a packet which includes higher-resolution encoded data. A receiving terminal can use the level of priority assigned to the IP header or the RTP header of each packet to process lower-frequency packets earlier. Even when congestion occurs in a network, the rate of discarding packets is reduced and image quality is improved.

FIG. 16 shows an example priority-level setting map in which levels of priority assigned to the RTP headers and the IP headers of scalable-encoded data are associated with resolutions and SNRs (image quality).

In the priority-level setting map shown in FIG. 16, resolutions have three layer levels 0 to 2, and SNRs (image quality) have three layer levels 0 to 2. In other words, the number of wavelet divisions in JPEG-2000 is set to two, that is, three levels of resolutions are used, and three levels of SNRs (image quality) are used. The lower the level number is, the more important the corresponding data is.

When mapping is performed to the RTP headers of data encoded according to a progressive order of spatial resolutions, for example, since an image having a higher spatial resolution is decoded by using an image having a lower spatial resolution, it is necessary to assign a higher level of priority to data having a lower spatial resolution.

In a network where its bandwidth is not wide enough to divide image quality into levels, the highest level [0] of priority is assigned to both the RTP header and the IP header of a packet which includes encoded data corresponding to a level [0] of resolution, irrespective of image quality.

According to this rule, in the present case, mapping is performed such that different levels of priority are assigned to RTP headers according to two groups of SNRs (image quality) for encoded data having resolution levels 1 and 2. More specifically, the level [1] of priority is assigned to the RTP header of a packet which includes encoded data having the resolution level 1 and the SNR level 0, and the level [2] of priority is assigned to the RTP header of a packet which includes encoded data having the resolution level 1 and the SNR level 1 or 2. The level [3] of priority is assigned to the RTP header of a packet which includes encoded data having the resolution level 2 and the SNR level 0 or 1, and the level [4] of priority is assigned to the RTP header of a packet which includes encoded data having the resolution level 2 and the SNR level 2. When retransmission is performed with error control, a request for re-transmitting a packet having a higher level of priority prevents congestion of re-transmitted packets.

It is preferred that mapping from RTP to IP be performed such that levels of priority which can be supported by network layer service such as DiffServ are specified. In the priority-level setting map shown in FIG. 16, three levels of priority are assigned to IP headers, and the levels of priority for resolutions are mapped as they are onto the levels of priority for the IP headers.

Various priority-level setting maps can be used in addition to this case. As described above, it is possible that levels of priority depending on an application are assigned to RTP payload headers, and levels of priority are further assigned to IP headers, according to the degree of importance of scalable data. With the use of these multiple levels of priority, an error control method can be changed for each layer or rate control can be applied to each layer.

Levels of priority assigned to RTP payload headers may be dynamically changed according to an application, a user's request, or receiving-terminal information received from a receiving terminal. Levels of priority assigned to IP payload headers may be dynamically changed according to a network condition, such as the degree of congestion in a network. The data transmission apparatus at the data transmission site receives receiving-terminal information from a receiving terminal, has a structure to analyze the information, and also has a structure to monitor and analyze a network condition.

Since levels of priority can be specified separately for RTP payload headers and IP headers, different levels of priority can be used between the network layer and a layer dependent on an application, and hence the quality of transmission data can be independently controlled. When a network supports DiffServ, for example, if levels of priority are specified in a manner suited to DiffServ, the data loss rate of low-frequency parts of an image is reduced.

The packetizer 44 shown in FIG. 9 packetizes data scalable-encoded by the encoder 42 according to the above-described processing, for each layer, stores in packets, assigns levels of priority corresponding to the layers of the scalable-encoded data to the RTP headers and to the IP headers to execute IP-packet generation processing. The IP packets generated in this way are sent to a network through the network interface 46.

[Structure and Processing of Data Receiving Site]

The structure and processing of a data receiving site for receiving packets in which encoded data is stored as payloads, in the system according to the present invention will be described next. The data receiving site executes packet receiving, packet processing, and decoding of the encoded data stored in the packets.

Figure 17:
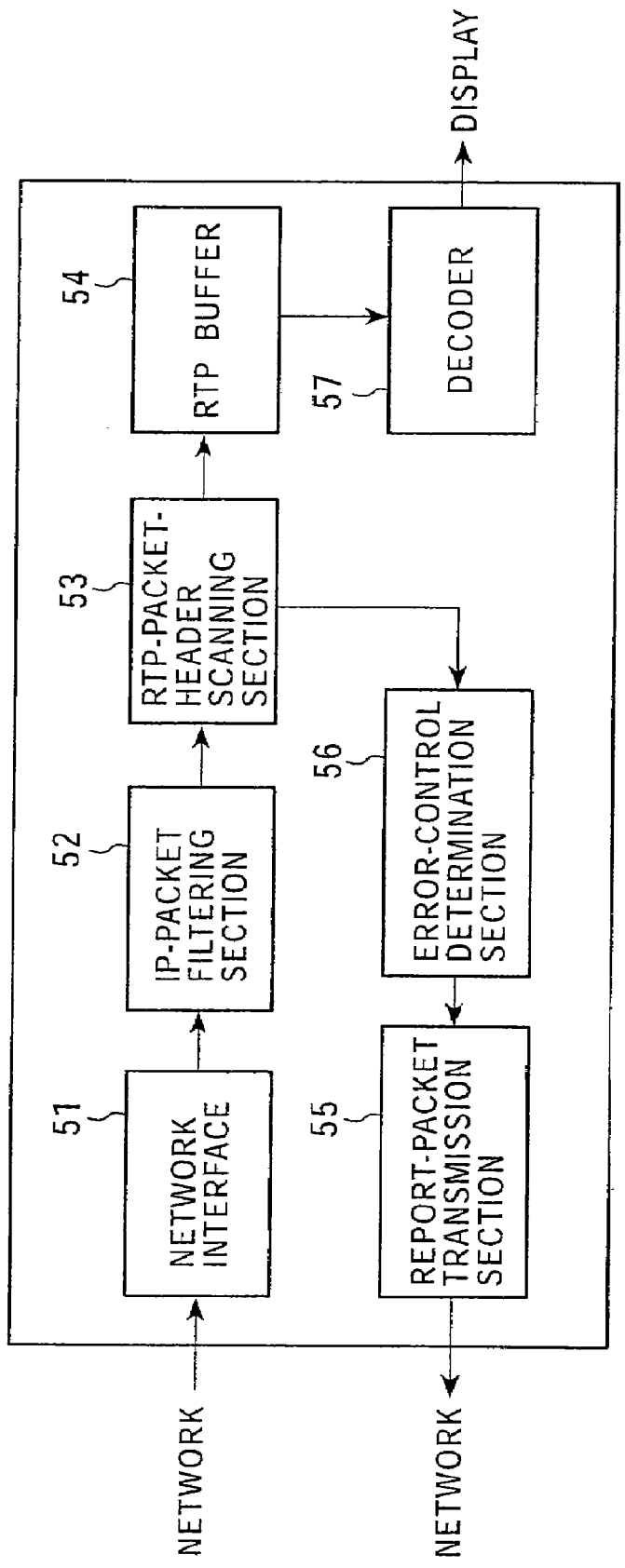
FIG. 17 is a block diagram of a data receiving apparatus according to the present invention.

FIG. 17 is a block diagram of a data receiving apparatus (terminal) in the data receiving site in the system according to the present invention.

A network interface 51 receives packets, and an IP-packet filtering section 52 determines whether the packets are to be processed by a receiving side and applies filtering to unnecessary packets. For example, filtering is performed so as to pass packets having levels of priority to be processed according to the performance of the terminal, to a decoder 57. For example, a terminal having a low-resolution display determines packets having higher levels of priority according to the levels of priority assigned to the IP headers. Packets having higher levels of priority, such as packets having the level 0 or 1 of priority assigned to the IP headers, are passed to the decoder 57, and packets having the levels 2, 3, . . . of priority are not passed to the decoder 57 and discarded.

Then, an RTP-packet-header scanning section 53 analyzes the levels of priority of the filtered packets, and determines whether their order is correct and whether there is a missing packet, and stores the packets in an RTP buffer 54. The RTP-packet-header scanning section 53 determines the levels of priority specified in the RTP payload headers of the RTP headers, selects only packets having the levels of priority to be processed by this data receiving apparatus and passes them to the decoder 57, and does not pass packets having equal or lower levels of priority to or than that to be processed by this data receiving apparatus but discards them.

As described above, the IP-packet filtering section 52 and the RTP-packet-header scanning section 53 function as packet-priority-level-information determination parts for determining whether packets have levels of priority equal to or higher than a value specified according to the processing ability of the data receiving apparatus. The decoder 57 decodes only data stored in packets having levels of priority equal to or higher than a value specified according to the processing ability of the data receiving apparatus.

The RTP-packet-header scanning section 53 further executes packet-loss detection processing according to sequence numbers in the FTP headers. When a packet loss is detected, an error-correction determination section 54 determines whether a re-transmission request is issued with the level of priority being taken into account. When a retransmission request is issued, a report-packet transmission section 55 sends a report packet which stores sequence-number information to the data transmission source to report the sequence number of the RTP packet to be re-transmitted.

When the RTP buffer 54 outputs packet payloads to the decoder 57, the decoder 57 decodes received data, that is, encoded data stored as the payloads of packets, and outputs an image or sound to an output apparatus such as a display.

Figure 18:
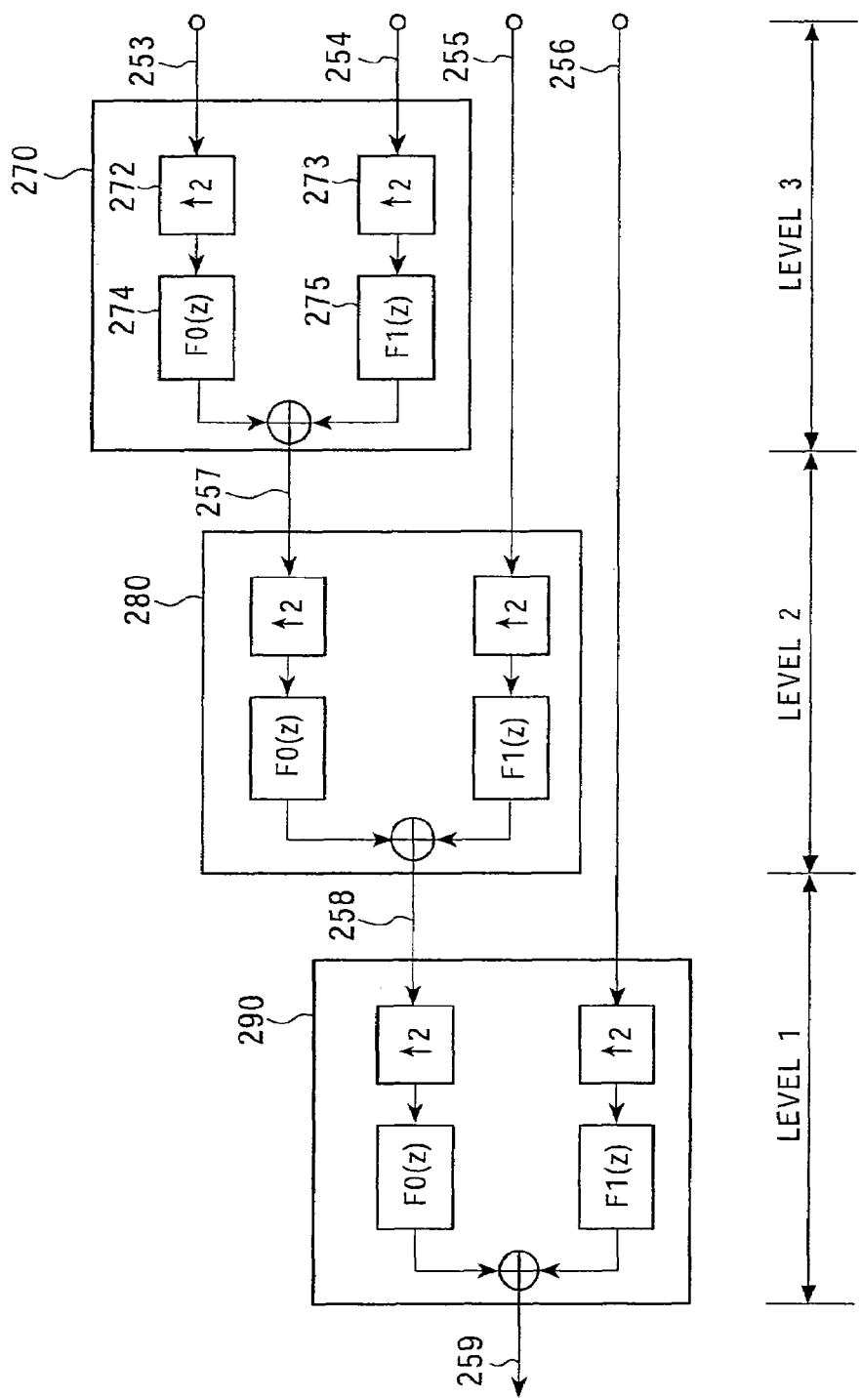
FIG. 18 is a view used for describing inverse wavelet transform processing.

FIG. 18 shows an example detailed structure of the decoder 57. The decoder 57 has an inverse wavelet transform processing structure for performing the inverse operation of the wavelet transform processing described before by referring to FIG. 5. More specifically, when the bandwidth components 253, 254, 255, and 256 output from the wavelet transform section described by referring to FIG. 5 are input to an inverse wavelet transform section shown in FIG. 18, the resolutions of the LLL component 253 and the LLH component 254 are doubled by up-samplers 272 and 273. Then, the low-frequency component is filtered by a low-pass filter 274, the high-frequency component is filtered by a high-pass filter 275, and they are synthesized by an adder. A circuit section 270 having the devices described so far completes the inverse transform processing of the transform processing performed by the level-3 circuit section 230 shown in FIG. 5, and an LL component 257 which is a level-2 low-frequency component is obtained. This processing is repeated to the level 1 to output a decoded image 259 obtained after final inverse transform. More specifically, a level-2 circuit section 280 and a level-1 circuit section 290 have the same structure as the level-3 circuit section 270, the output of the level-3 circuit section 270 is input to a low-frequency side of the level-2 circuit section 280, and the output of the level-2 circuit section 280 is input to a low-frequency side of the level-1 circuit section 290. The basic structure of a general inverse wavelet transform section has been described.

Figure 19:
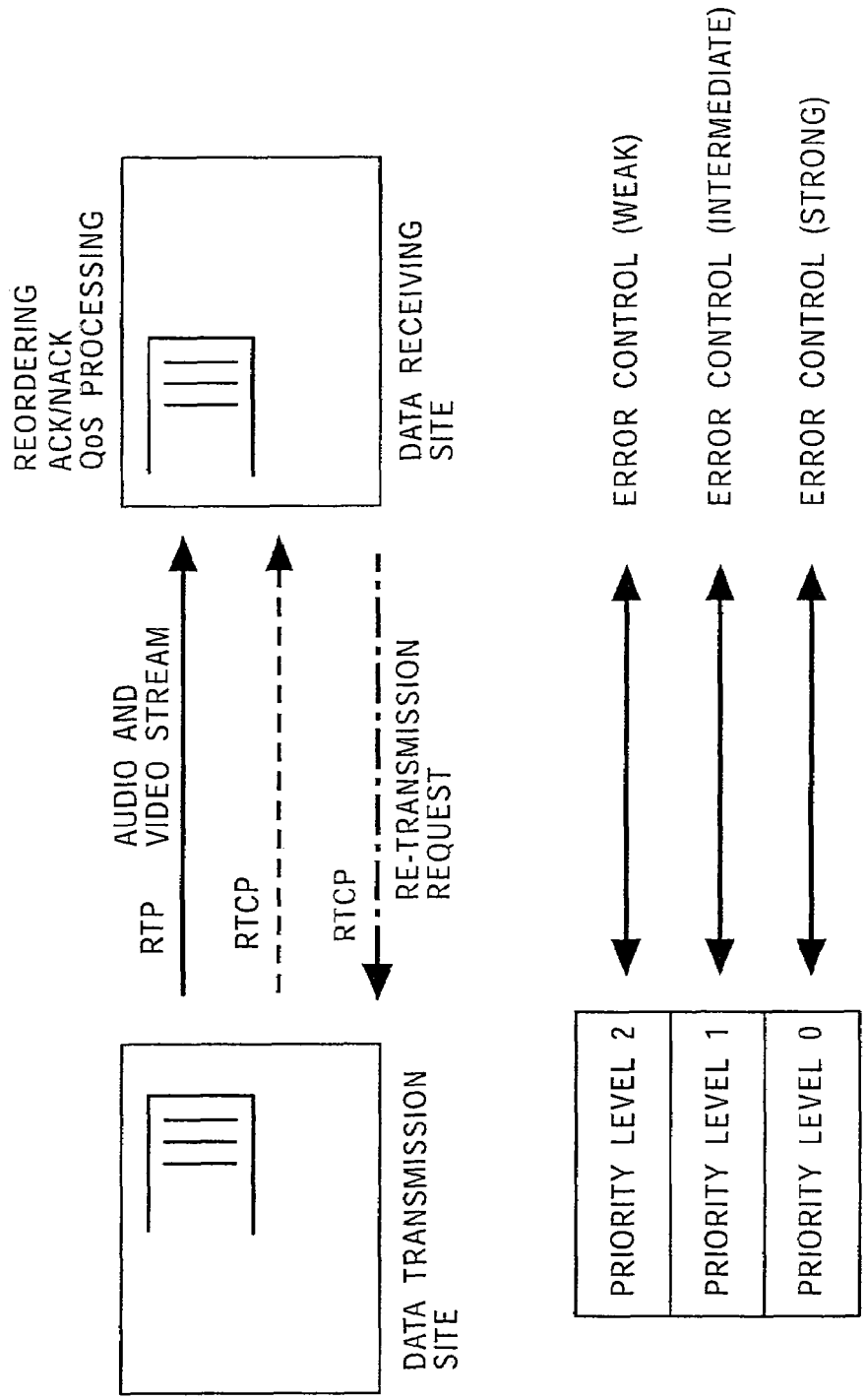
FIG. 19 is a view used for describing packet retransmission control executed between the data transmission apparatus and the data receiving apparatus.

A re-transmission-request-processing sequence executed when the data receiving side detects a packet loss will be described next by referring to FIG. 19. Since RTP headers have sequence numbers, the data receiving site detects a packet loss according to the RTP headers. The effect of a packet loss on image quality depends on the degree of importance of the lost packet. For example, when high-frequency encoded data is lost, image quality does not largely reduced even if the data is not used. When low-frequency data is lost, a large effect is given.

The data receiving site performs error control according to the degree of importance of a lost packet. A forward error correction (FEC) method is, for example, used as an error control method. A method for applying FEC to a packet loss in AAL1 of ATM or a method similar to a method in which a matrix described in the specification of the types 1 and 2 of B-ISDN ATM adaptation layer (AAL) in ITU-T Recommendation 1.363.1 is generated to apply Reed-Solomon decoding to the lost packet can be used.

The data receiving site changes a re-transmission control method according to the degree of importance of a lost packet. As shown at an upper part of FIG. 19, the data transmission site distributes images and sound by RTP, and the data receiving site detects a lost packet according to sequence numbers in RTP packet headers, and reports to the data transmission site re-transmission request information of the lost packet by a packet used in RTCP. The data transmission site re-transmits the lost packet reported by the data receiving site. Before executing re-transmission processing, the data transmission site performs control such that the level of priority of the packet for which a retransmission request has been issued is determined by using the IP header or the RTP payload header, a packet having a higher level of priority is re-transmitted by priority, and a packet having a lower level of priority may be not retransmitted in some cases. A re-transmission packet is sent together with usual requested data. Therefore, when a transmission band is limited, control may be performed such that packet data having a lower level of priority is not sent.

The data receiving site can receive and process the retransmitted packet to recover the lost packet to increase image quality. The relationships between the retransmission control and levels of priority are shown at a lower part of FIG. 19. Error control is enhanced and a retransmission request is issued for data having a higher-level (priority level 0) of priority, such as layer-level-0 data, and error control is weakened and a re-transmission request is not issued for data having a lower level (priority level 2) of priority. Such control can be changed according to a network condition and terminal processing.

When many packet losses occur, a packet requesting retransmission and a re-transmitted packet are also lost in many cases. If re-transmission processing is performed for all lost packets, packet congestion increases, even the recovery of important low-frequency data becomes difficult, and image quality deterioration cannot be prevented. In contrast, when re-transmission control is executed with the quality to be assured being determined according to the levels of priority stored in RTP payload headers, that is the degrees of importance of an image, in other words, when a re-transmission request is issued only for packets having higher levels of priority, it is possible that an increase of packet congestion is suppressed, and a higher probability of receiving packets having higher degrees of importance, for which a re-transmission request has been issued is obtained. This method allows important data to be positively re-transmitted and image quality to be improved even when the same band is used.

[Processes at Data Transmission and Receiving Sites]

Figure 20:
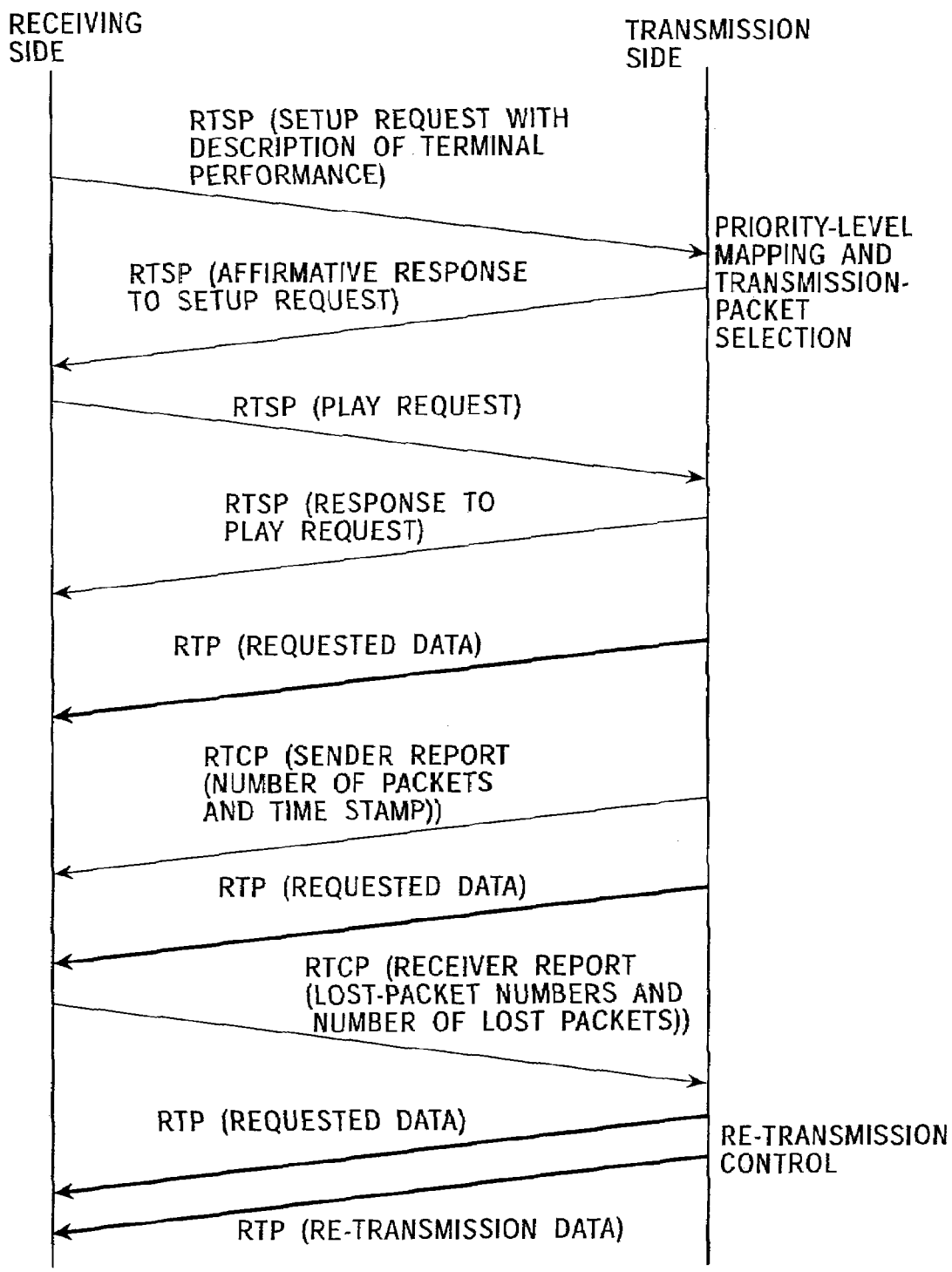
FIG. 20 is a view of a processing sequence executed between the data transmission apparatus and the data receiving apparatus.

Processes performed at the data transmission site and the data receiving site will be described below together. An example protocol sequence between the data transmission side and the data receiving side will be described first by referring to FIG. 20. The data receiving side issues a setup request to the data transmission side by RTSP. The setup request includes the display resolution, the CPU processing performance, the service quality request, and the usable bandwidth of the data receiving side.

When the transmission side can respond to the setup request, it responds to the request. Then, the receiving side issues a play request by RTSP. When the transmission side can respond to the play request, it responds to the request, stores scalable-encoded data as payloads, generates RTP packets in which levels of priority corresponding to layers have been specified in RTP payload headers and IP headers, and sends the packets.

The transmission side sends to the receiving side at a constant interval a sender report which includes a time stamp and the number of transmitted packets according to RTCP. The receiving side receives the sender report, and sends a receiver report which includes information of the number of lost packets and the sequence number of the lost packets, used for re-transmission processing for the lost packets. The transmission side receives the receiver report, performs re-transmission control, and sends the lost packets.

The data transmission side performs control such that packets having higher levels of priority are re-transmitted earlier with the priority levels of the packets being taken into account, as described above. Re-transmitted packets are sent together with usual requested data. Therefore, when a transmission bandwidth is limited, control is performed such that packets having lower levels of priority in the image-quality progressive order are not transmitted.

Figure 21:
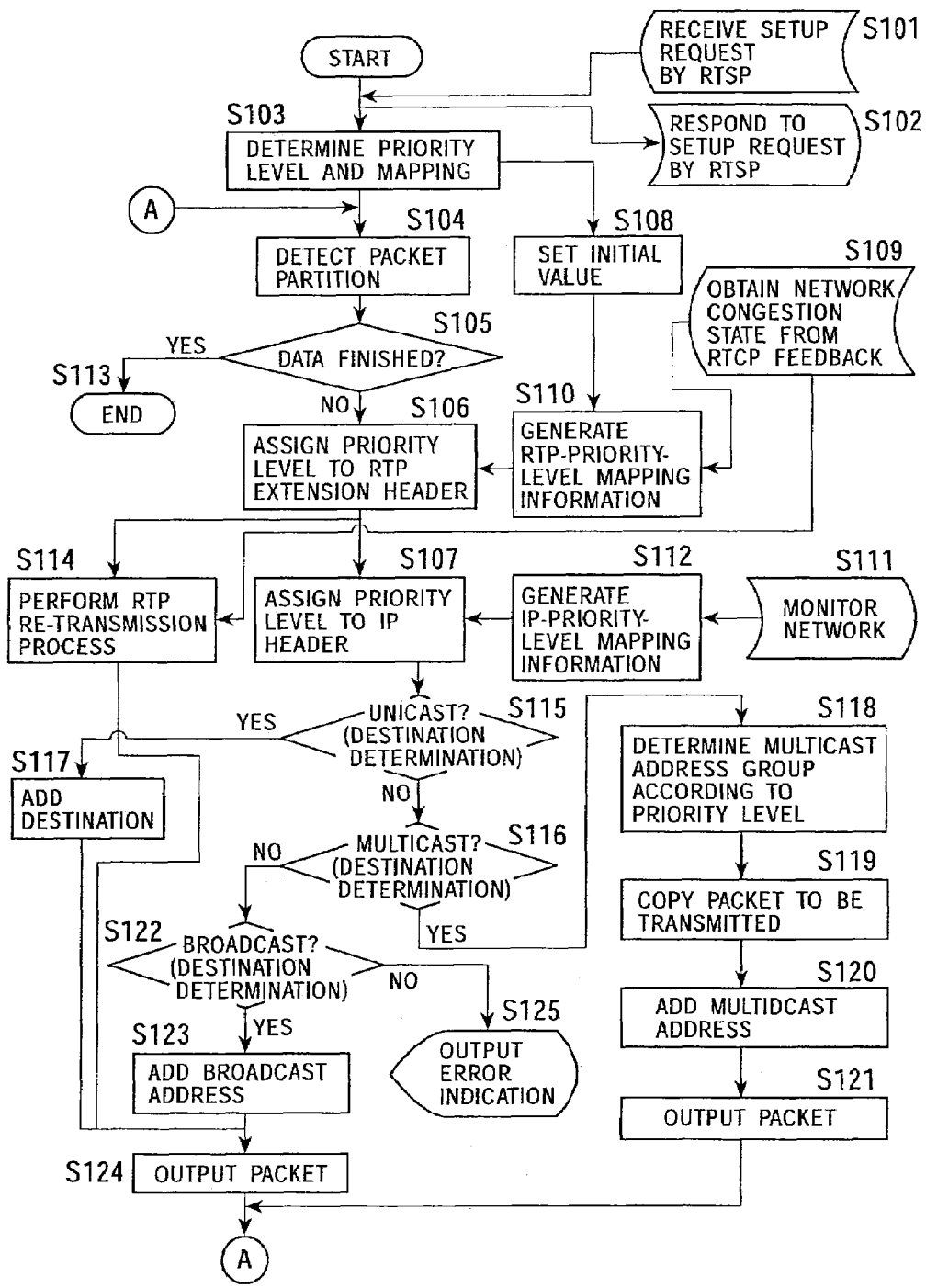
FIG. 21 is a flowchart of processing executed by the data transmission apparatus.

Processing in the data transmission site will be described next by referring to a flowchart shown in FIG. 21. A case will be taken as an example, in which scalable-encoded data is stored in a recording medium in advance, and the data is read, packetized, and transmitted.

The transmission apparatus is activated, and the preparation of transmission is started. Then, in step S101, the transmission side receives a setup request from the receiving side by RTSP. When the preparation of transmission has been finished, the transmission side sends a setup response to the receiving side in step S102.

In step S103, the transmission side determines a priority level and a mapping method for RTP/IP headers with the display resolution, the CPU processing performance, the requested service quality, and the usable bandwidth of the receiving side being used as input parameters. The value is used as an initial value in an RTP-priority-level mapping information generation process in step S110.

In step S104, the transmission side detects a packet partition of stored data corresponding to the quality requested by the receiving side. The word "packet" used here refers to a cluster unit in each layer level; for example, the minimum code string used in JPEG-2000 employing the wavelet transform. In step S105, whether all data has been processed is determined. When it has been processed, the processing is terminated in step S113. When it has not yet been processed, a priority level corresponding to the layer level of scalable-encoded data stored in the packet is assigned to the RTP extension header, that is, the RTP payload header, in step S106.

The priority level assigned to the RTP payload header in step S106 may be that specified in a priority-level setting map (such as the map shown in FIG. 15), which serves as mapping information specified in advance. Alternatively, the priority level may be specified according to a priority-level setting map generated in S110 when a dynamic generation process thereof is executed according to a network congestion state obtained in step 5109 according to RTCP feedback information.

The data in which the level of priority has been assigned to the RTP payload header in step S106 is stored in step S114 for an RTP re-transmission process. To respond to a re-transmission request for a packet loss, sent from the receiving side, transmission packets are stored in step S114 for a predetermined period. A packet to be re-transmitted is determined in step S114 when the number of a lost packet is reported according to the RTCP feedback in step S109, and a memory area for packets which have been received can be released. The re-transmission packet is output in step S124, and the processing returns to step S104.

In the packet re-transmission process, control is performed as described above such that packets having higher levels of priority are re-transmitted earlier with the levels of priority of packets being taken into account. When a transmission bandwidth is limited, for example, control is performed such that packets having lower levels of priority in the image-quality progressive order are not transmitted.

In step S107, an IP-packet generation process is executed. A level of priority corresponding to the layer of scalable-encoded data stored in an IP packet is specified in the IP header. The priority level assigned to the IP header in step S107 may be that specified in a priority-level setting map (such as the map shown in FIG. 15), which serves as mapping information specified in advance. Alternatively, the priority level may be specified according to a priority-level setting map generated in S112 when a dynamic generation process thereof is executed according to a network congestion state obtained in step S111. The level of priority is specified, for example, in the TOS field for IPv4 and in the flow label in IPv6 in the IP header.

Then, the destination of the IP packet is determined in steps S115, S116, and S122. It is determined in step S115 whether unicast is to be performed. When it is determined that unicast is to be performed, destination information is added in step S117. When it is determined in step S116 that multicast is to be performed, it is determined in step S118 that the packet belongs to which multicast group according to the level of priority assigned to the IP header, a copy of a packet section which satisfies the request of the corresponding multicast group is made in step S119, and a multicast address is assigned in step 5120. The steps from S118 to S120 are repeated the same number of times as the number of destinations included in the multicast group, and the packet is transmitted in step S121.

When it is determined in step S122 that broadcast is to be performed, a broadcast address is assigned in step S123. Addresses other than those described above usually are not generated. When the result of the determination of step S122 is negative, an error indication is output in step S125. When the packet is output in step S124, the processing returns to step S104 for detecting a packet partition.

As described above, the data transmission site stores scalable-encoded data in a packet to be transmitted by unicast, multicast, or broadcast, as a payload, and assigns levels of priority corresponding to the layer level of the encoded data stored in the packet to the RTP payload header and to the IP header. The data transmission site also executes the re-transmission processing in response to a retransmission request sent from the data receiving site.

Figure 22:
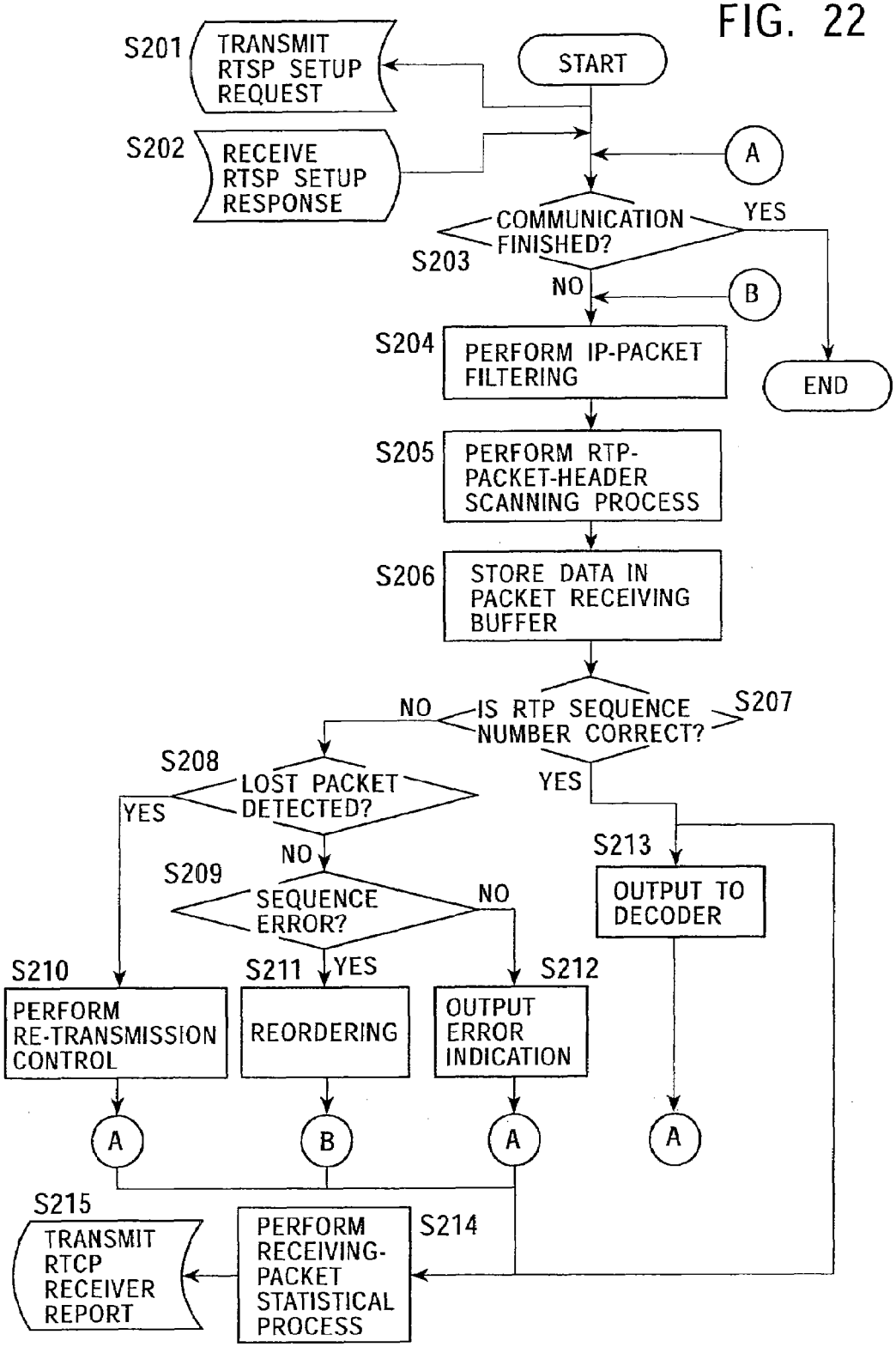
FIG. 22 is a flowchart of processing executed by the data receiving apparatus.

Processing in the data receiving site will be described next by referring to a flowchart shown in FIG. 22. After the preparation of receiving is started, the receiving side sends a setup request by RTSP to the transmission side in step S201. The request includes information such as the performance of a terminal and requested service quality. The receiving side receives a setup response from the data transmission side in step S202, and opens a port for receiving.

It is determined in step S203 whether communication has been finished. When it is determined that the communication has been finished, the processing is terminated. In step S204, an IP filtering process is executed. It is determined according to the IP header of a packet whether the packet is to be processed by the receiving side, and an unnecessary packet is filtered. For example, this is a filtering process for passing only packets having levels of priority to be processed according to the performance of a terminal, to the decoder. When the terminal has a low-resolution display, for example, packets having higher levels of priority, such as the levels 0 and 1 of priority, are determined according to the levels of priority specified in the IP headers and passed to the decoders, and packets having the level 2 or larger of priority are not passed to the decoder but discarded.

An RTP-packet-header scanning process is applied in step 5205 to the packets to which filtering has been executed in step S204 according to the level of priority assigned to the IP header. In the RTP-packet-header scanning process, the level of priority specified in the RTP payload header of the RTP header is determined, and only a packet having a level of priority to be processed by the receiving site itself is passed to the decoder. To this end, the packet is stored in a packet receiving buffer in step 5206. A packet having a low level to priority lower than a level of priority to be processed by the receiving site itself is not passed to the decoder but discarded.

Then, in step S207, the RTP header of the received packet is read and it is determined whether its sequence number is correct; that is, whether the order of the packet is correct and whether a packet has been lost. When its sequence number is wrong, a packet loss is detected in step S208. When a packet loss is found, re-transmission control is performed in step S210, and the sequence number of the lost packet is reported to the transmission side.

When a packet loss is not found, it is determined in step S209 according to the sequence number of the RTP header that a sequence error has occurred. When a sequence error has occurred, the order is arranged in step S211. In other cases, an error indication is output in step S212. When it is determined in step S207 that the sequence number is correct, the packet is sent to the decoder in step S213, and the memory area of the sent packet in the packet receiving buffer is released.

In step S214, a packet statistical process is executed according to the packet output from the buffer to the decoder and the result of the re-transmission process. An RTCP receiver report is sent to the transmission side in step S215.

As described above, the data receiving site determines the level of priority corresponding to the layer level of encoded data stored in a received packet according to the RTP payload header and the IP header of the received packet, determines whether the decoding process is applied and, if necessary, performs decoding. In addition, the data receiving site detects a packet loss according to the sequence number of the RTP packet, and executes error control and re-transmission control based on the level of priority determined according to the RTP payload header and the IP header.

[Example Structure of a Data Transmission and Receiving Apparatus]

The series of processing described in the above embodiment can be executed by hardware, by software or by a combination of both. When the series of processing is executed by software, a program having a processing sequence is installed into a memory of a data processing apparatus which is built in special hardware, or into a general-purpose computer, which can execute various functions, and executed. When the series of processing is executed by software, a program constituting the program is installed, for example, into a general-purpose computer or a microcomputer.

Figure 23:
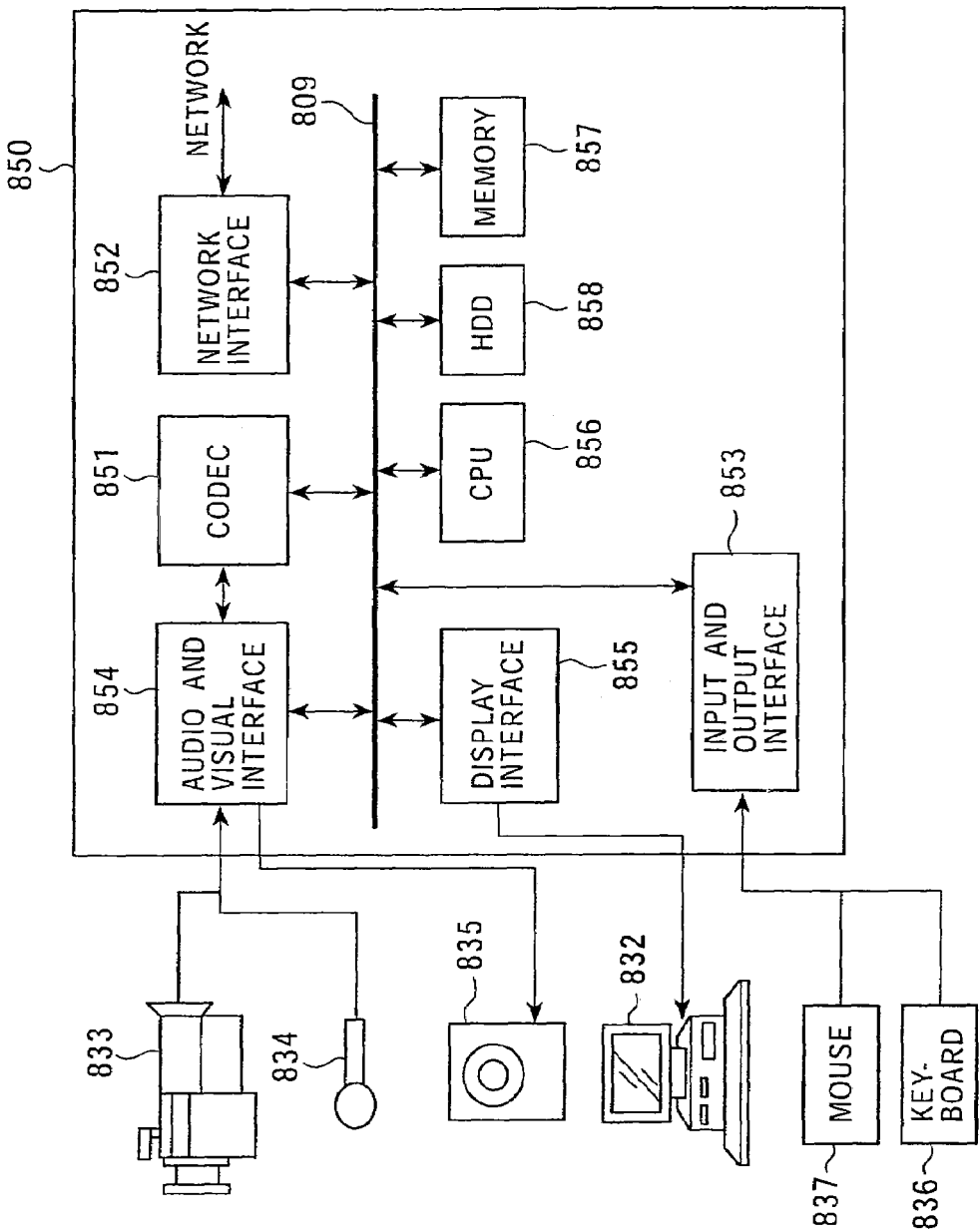
FIG. 23 is a view of an example system structure of a data transmission apparatus and a data receiving apparatus.

FIG. 23 shows an example system structure of a data transmission apparatus and a data receiving apparatus which execute the series of processing described in the above embodiment. Data transmitted and received in the system of the present invention is scalable-encoded data. The data transmission apparatus executes encoding processing, and the data receiving apparatus performs decoding processing. Encoded data is transmitted and received as packets through a network. The data transmission side generates packets (performs packetizing) and the data receiving side develops the packets (performs depacketizhng).

A data transmission and receiving apparatus (such as a PC) 850 shown in FIG. 23 includes a codec 851 for executing encoding, decoding, packet generation, and packet development, a network interface 852 serving as an interface with a communication network, an input and output interface 853 serving as an interface with input units such as a mouse 837 and a keyboard 836, an audio and visual interface 854 for inputting and outputting data to and from audio-and-visual-data input and output units, such as a video camera 833, a microphone 834, and a speaker 835, a display interface 855 serving as a data output interface with a display 832, a CPU 856 for controlling data transfer among the data input and output interfaces, the codec 851, and the network interface 852, and for controlling various programs, a memory 857 formed of a RAM and a ROM, for storing various programs controlled by the CPU 856, for storing data, and for serving as a working area of the CPU 856, and an HDD 858 serving as a medium for storing data and programs. All circuit components are connected through a PCI bus 859, and can allow data to be transmitted and received to and from each other.

The codec 851 receives, for example, image data from the video camera 833 and audio data from the microphone 834, and executes scalable encoding and packet generation (packetizing) to finally generate IP packets having scalable-encoded data as payloads, as shown in FIG. 23. The generated IP packets are output to the PCI bus 859, output to a network through the network interface 852, and distributed, for example, to a destination address specified in the headers of the IP packets.

The data transmission and receiving apparatus may be configured such that video data input from the video camera 833 and audio data input from the microphone 834 are scalable-encoded and output to a network through the network interface 852 under the control of the CPU 856 according to a software encoding program stored in the HDD 858 or the memory 857.

Data in IP packets input through a network is sent to the PCI bus 859 through the network interface 852 and input to the codec 851. The codec 851 applies packet development processing (depacketizes) of the input data to extract scalable 0.1 data stored in the packets as payloads, executes decoding, and reproduces the data to output to the display 832 and the speaker 835.

Data to be processed in the above embodiment, such as images, can be input from an input unit such as a camera, from a data input apparatus such as a scanner, or from a removable recording medium such as a floppy disk, a compact disc read only memory (CD-ROM), a digital versatile disk (DVD), a magnetic disk, or a semiconductor memory.

The CPU 856 can load a program stored in the hard disk or a program transmitted from a satellite or a network, received, and installed, into a memory such as a RAM and execute it, in addition to a program stored in the ROM.

In the present specification, a program may be processed by one computer or may be distributed-processed by a number of computers. In addition, a program may be transmitted from a remote computer and executed.

As described above, according to a structure of the present invention, since a data transmission site stores scalable-encoded data as payloads in packets to be sent, and assigns priority-level information corresponding to the layer level of the encoded data stored in the packets to the packets, a data receiving site executes processing with the priority-level information being taken into account, and the most appropriate packet processing corresponding to the performance of a terminal is allowed.

In addition, according to a structure of the present invention, since re-transmission control is performed according to priority-level information corresponding to the layer level of encoded data, encoded data having a higher level of priority can be re-transmitted earlier to suppress the degree of congestion on a network. In this case, the arrival rate of re-transmitted packets is increased and the quality of data displayed on a receiving terminal is improved.

Further, according to a structure of the present invention, since a level of priority depending on an application is specified in the RTP payload header of a packet and a level of priority is also specified in the IP header according to the degree of importance of scalable data stored in the packet, an error control method can be changed in each layer by using a number of pieces of priority-level information, and a rate control can be executed.

Still further, according to a structure of the present invention, a level of priority specified in an RTP payload header is dynamically changed according to an application or a user's request. A level of priority specified in an IP header is dynamically changed according to the degree of congestion on a network. Therefore, different levels of priority can be used between the network layer and a layer dependent on an application. The quality of transmission data can be independently controlled. When a network supports DiffServ, for example, if a level of priority is specified in an IP header in a manner suitable for DiffServ, a data-loss rate in a low-frequency part of an image is reduced.

Although the present invention has been described with reference to specific embodiments, those of skill in the art will recognize that changes may be made thereto without departing from the spirit and scope of the present invention as set forth in the hereafter appended claims.

The invention claimed is:

1. A data receiving apparatus for receiving packets which store encoded data, comprising:
   receiving parts for receiving packets, wherein the packets store scalable-encoded data of an image signal;
   packet-priority-level-information determination parts for determining whether the packets have the information of a level of priority equal to or larger than a value specified according to a processing performance of the data receiving apparatus, wherein the information of a level of priority corresponds to a layer of the scalable-encoded data according to a priority-level setting map in which the layer of the scalable-encoded data is associated with a level of priority and is stored as additional information of the packet, wherein a first layer of the scalable-encoded data associated with a high level of priority includes a first data area of scalable-encoded data of the image signal, and a second layer of the scalable-encoded data associated with a low level of priority includes the first data area and a second data area of scalable-encoded data of the image signal; and
   decoding parts for decoding data stored in packets selected by the packet-priority-level-information determination parts.

2. A data receiving apparatus as claimed in claim 1, wherein the information of a level of priority corresponding to the layer of the data is stored in an RTP header.

3. A data transmission apparatus as claimed in claim 1, wherein the information of a level of priority corresponding to the layer of the data is stored in an IP header.

4. A data transmission apparatus as claimed in claim 1, wherein the information of a level of priority corresponding to the layer of the data is stored in an RTP header and an IP header.

5. A data receiving apparatus as claimed in claim 1, wherein the data receiving apparatus further includes a structure for transmitting receiving-terminal information to a data transmission apparatus.

6. A data receiving apparatus as claimed in claim 1, wherein the information of a level of priority corresponding to the layer of the data is changed according to a network condition.

7. A data receiving apparatus as claimed in claim 1, wherein the data receiving apparatus further includes a retransmission control structure for transmitting a packet retransmission request to a data transmission apparatus.

8. A data receiving apparatus as claimed in claim 1, wherein the packet-priority-level-information determination parts include IP packet filtering parts for determining a level of priority assigned to an IP header of a received packet, and RTP-packet-header scanning parts for determining a level of priority assigned to an RTP header of the received packet.

9. A data receiving apparatus for receiving packets which store encoded data, comprising:
   receiving parts for receiving packets, wherein the packets store scalable-encoded data of an image signal, wherein the scalable-encoded data has different spatial resolutions;
   packet-priority-level-information determination parts for determining whether the packets have the information of a level of priority equal to or larger than a value specified according to a processing performance of the data receiving apparatus, wherein the information of a level of priority corresponds to layers of different spatial resolutions and is stored as additional information of the packet, wherein a first layer of the scalable-encoded data associated with a high level of priority includes a first data area of scalable-encoded data of the image signal, and a second layer of the scalable-encoded data associated with a low level of priority includes the first data area and a second data area of scalable-encoded data of the image signal; and
   decoding parts for decoding data stored in packets selected by the packet-priority-level-information determination parts.

10. A data receiving apparatus as claimed in claim 9, wherein the information of a level of priority corresponding to the layer of the data is stored in an RTP header.

11. A data transmission apparatus as claimed in claim 9, wherein the information of a level of priority corresponding to the layer of the data is stored in an IP header.

12. A data transmission apparatus as claimed in claim 9, wherein the information of a level of priority corresponding to the layer of the data is stored in an RTP header and an IP header.

13. A data receiving apparatus as claimed in claim 9, wherein the data receiving apparatus further includes a structure for transmitting receiving-terminal information to a data transmission apparatus.

14. A data receiving apparatus as claimed in claim 9, wherein the information of a level of priority corresponding to the layer of the data is changed according to a network condition.

15. A data receiving apparatus as claimed in claim 9, wherein the data receiving apparatus further includes a retransmission control structure for transmitting a packet retransmission request to a data transmission apparatus.

16. A data receiving apparatus as claimed in claim 9, wherein the packet-priority-level-information determination parts include IP packet filtering parts for determining a level of priority assigned to an IP header of a received packet, and RTP-packet-header scanning parts for determining a level of priority assigned to an RTP header of the received packet.

17. A data receiving apparatus for receiving packets which store encoded data, comprising:
   receiving parts for receiving packets, wherein the packets store scalable-encoded data of an image signal, wherein the scalable-encoded data is encoded by progressive encoding processing;
   packet-priority-level-information determination parts for determining whether the packets have the information of a level of priority equal to or larger than a value specified according to a processing performance of the data receiving apparatus, wherein the information of a level of priority corresponds to a layer specified for a progressive order of the scalable-encoded data and is stored as additional information of the packet, wherein a first layer of the scalable-encoded data associated with a high level of priority includes a first data area of scalable-encoded data of the image signal, and a second layer of the scalable-encoded data associated with a low level of priority includes the first data area and a second data area of scalable-encoded data of the image signal; and
   decoding parts for decoding data stored in packets selected by the packet-priority-level-information determination parts.

18. A data receiving apparatus as claimed in claim 17, wherein the information of a level of priority corresponding to the layer of the data is stored in an RTP header.

19. A data transmission apparatus as claimed in claim 17, wherein the information of a level of priority corresponding to the layer of the data is stored in an IP header.

20. A data transmission apparatus as claimed in claim 17, wherein the information of a level of priority corresponding to the layer of the data is stored in an RTP header and an IP header.

21. A data receiving apparatus as claimed in claim 17, wherein the data receiving apparatus further includes a structure for transmitting receiving-terminal information to a data transmission apparatus.

22. A data receiving apparatus as claimed in claim 17, wherein the information of a level of priority corresponding to the layer of the scalable-encoded data of the image signal is changed according to a network condition.

23. A data receiving apparatus as claimed in claim 17, wherein the data receiving apparatus further includes a re-transmission control structure for transmitting a packet re-transmission request to a data transmission apparatus.

24. A data receiving apparatus as claimed in claim 17, wherein the progressive encoding processing specifies different spatial resolutions in a progressive order, and the information of a level of priority corresponds to a layer specified for each spatial resolution of the data.

25. A data receiving apparatus as claimed in claim 17, wherein the progressive encoding processing specifies different signal to noise ratio in a progressive order, and the information of a level of priority corresponds to a layer specified for each signal to noise ratio of the data.

26. A data receiving apparatus as claimed in claim 17, wherein the progressive encoding processing specifies different color components in a progressive order, and the information of a level of priority corresponds to a layer specified for each color component of the data.

27. A data receiving apparatus as claimed in claim 17, wherein the packet-priority-level-information determination parts include IP packet filtering parts for determining a level of priority assigned to an P header of a received packet, and RTP packet-header scanning parts for determining a level of priority assigned to an RTP header of the received packet.

* * * * *